United States Patent
Murata et al.

(10) Patent No.: US 7,778,656 B2
(45) Date of Patent: Aug. 17, 2010

(54) TRANSMISSION POWER CONTROL METHOD AND APPARATUS

(75) Inventors: Shuuichi Murata, Kawasaki (JP); Yutaka Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1047 days.

(21) Appl. No.: 11/187,586

(22) Filed: Jul. 22, 2005

(65) Prior Publication Data
US 2006/0003789 A1    Jan. 5, 2006

Related U.S. Application Data

(63) Continuation of application No. PCT/JP03/07757, filed on Jun. 19, 2003.

(51) Int. Cl.
H04B 7/00 (2006.01)
H04B 1/04 (2006.01)
H01Q 11/12 (2006.01)
H04B 1/00 (2006.01)
H04B 15/00 (2006.01)

(52) U.S. Cl. ........ 455/522; 455/127.1; 455/127.5; 455/67.11; 455/67.13; 455/63.1

(58) Field of Classification Search .......... 455/69, 455/63.1, 67.11, 67.13, 114.2, 115.1, 296, 455/574, 522, 127.1, 127.5, 13.4, 135, 226.3
See application file for complete search history.

(56) References Cited

U.S. PATENT DOCUMENTS

| | | |
|---|---|---|
| 6,341,224 B1 | 1/2002 | Dohi et al. |
| 6,526,261 B1 | 2/2003 | Takeuchi et al. |
| 6,671,266 B1 * | 12/2003 | Moon et al. ........ 370/342 |
| 2003/0031135 A1 | 2/2003 | Itoh |

FOREIGN PATENT DOCUMENTS

| | | |
|---|---|---|
| EP | 1 168 657 | 1/2002 |
| EP | 1 215 926 | 6/2002 |
| JP | 11-313028 | 11/1999 |
| JP | 2000-252917 | 9/2000 |
| JP | 2002-016545 | 1/2002 |
| WO | WO 97/50197 | 12/1997 |
| WO | 01/52440 | 7/2001 |
| WO | WO 02/51040 | 6/2002 |

OTHER PUBLICATIONS

International Search Report dated Sep. 9, 2003.
Notification of Reason for Refusal dated Jun. 13, 2008, from the corresponding Japanese Application.
Supplementary European Search Report dated Apr. 6, 2010, from the corresponding European Application.

* cited by examiner

*Primary Examiner*—Eugene Yun
(74) *Attorney, Agent, or Firm*—Katten Muchin Rosenman LLP

(57) ABSTRACT

Disclosed is a transmission power control method for controlling a target SIR which is a target ratio of signal to interference upon comparing error rate and target error rate of receive data on a receiving side, and causing transmission power control to be performed on a transmitting side in such a manner that measured SIR will agree with the target SIR. The method includes previously measuring and storing a correspondence characteristic between error rate and SIR; finding, from the correspondence characteristic, a first SIR with respect to a target error rate and a second SIR with respect to a measured error rate; and updating the target SIR by increasing or decreasing the target SIR by the difference between the first SIR and the second SIR.

20 Claims, 20 Drawing Sheets

FIG. 2

| QUALITY No | $BLER_{quality}$ (dB) | SIR (dB) |
|---|---|---|
| 1 | $-\infty = 10\log_{10}(BLER) < -63$ | SIR 1 |
| 2 | $-63 \leq 10\log_{10}(BLER) < -62$ | SIR 2 |
| 3 | $-62 \leq 10\log_{10}(BLER) < -61$ | SIR 3 |
| ~ | ~ | ... |
| 62 | $-3 \leq 10\log_{10}(BLER) < -2$ | SIR 62 |
| 63 | $-2 \leq 10\log_{10}(BLER) < -1$ | SIR 63 |
| 64 | $-1 \leq 10\log_{10}(BLER) < 0$ | SIR 64 |
| 65 | $0 = 10\log_{10}(BLER)$ | SIR 65 |

FIG. 3

| QUALITY No | $BLER_{quality}$ (dB) | $SIR\_AMR$ (dB) | $SIR\_UDI$ (dB) | $SIR\_PKT$ (dB) | $SIR\_MULTI$ (dB) |
|---|---|---|---|---|---|
| 1 | $-\infty = 10\log_{10}(BLER) < -63$ | SIR_AMR1 | SIR_UDI1 | SIR_PKT1 | SIR_MULTI1 |
| 2 | $-63 \leq 10\log_{10}(BLER) < -62$ | SIR_AMR2 | SIR_UDI2 | SIR_PKT2 | SIR_MULTI2 |
| 3 | $-62 \leq 10\log_{10}(BLER) < -61$ | SIR_AMR3 | SIR_UDI3 | SIR_PKT3 | SIR_MULTI3 |
| ~ | ~ | ~ | ~ | ~ | ~ |
| 62 | $-3 \leq 10\log_{10}(BLER) < -2$ | SIR_AMR62 | SIR_UDI62 | SIR_PKT62 | SIR_MULTI62 |
| 63 | $-2 \leq 10\log_{10}(BLER) < -1$ | SIR_AMR63 | SIR_UDI63 | SIR_PKT63 | SIR_MULTI63 |
| 64 | $-1 \leq 10\log_{10}(BLER) < 0$ | SIR_AMR64 | SIR_UDI64 | SIR_PKT64 | SIR_MULTI64 |
| 65 | $0 = 10\log_{10}(BLER)$ | SIR_AMR65 | SIR_UDI65 | SIR_PKT65 | SIR_MULTI65 |

| SERVICE | PACKET | VOICE |
|---|---|---|
| REQUIRED BLER | 5.0E-02 | 5.0E-03 |
| STANDARD (REQUIRED BLER ±30%) | 6.5E-02 ~3.5E-02 | 6.5E-03 ~3.5E-03 |

FIG. 16

|  | UDI |
|---|---|
| REQUIRED BLER | 5.0E-05 |
| STANDARD (STANDARD RANGE ±30%) | 6.5E-05 ~3.5E-05 |

FIG. 23  PRIOR ART
(A)
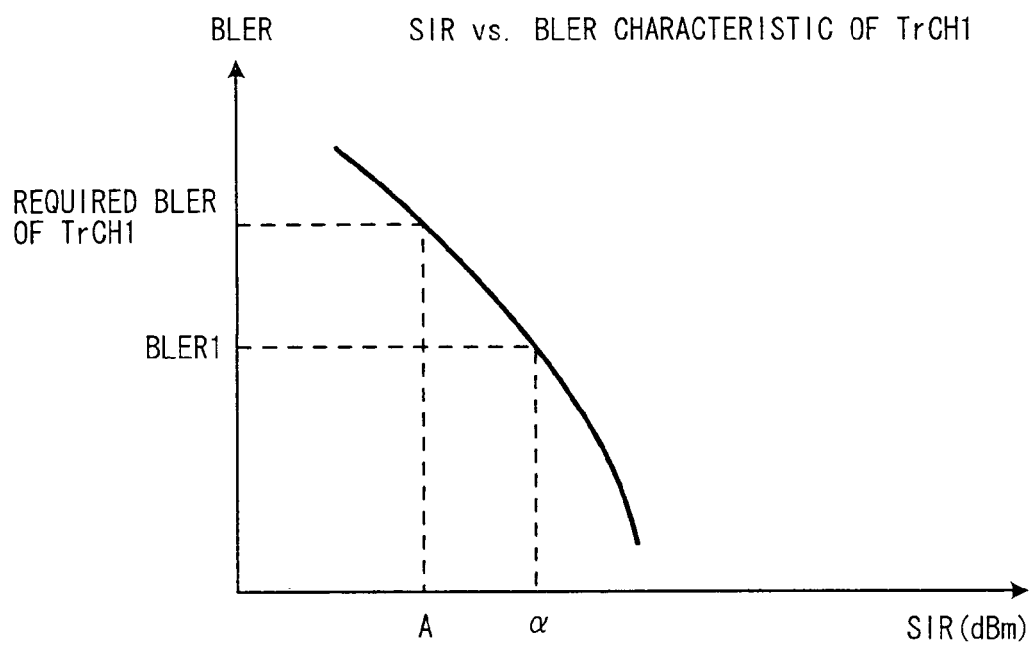
SIR vs. BLER CHARACTERISTIC OF TrCH1
(B)
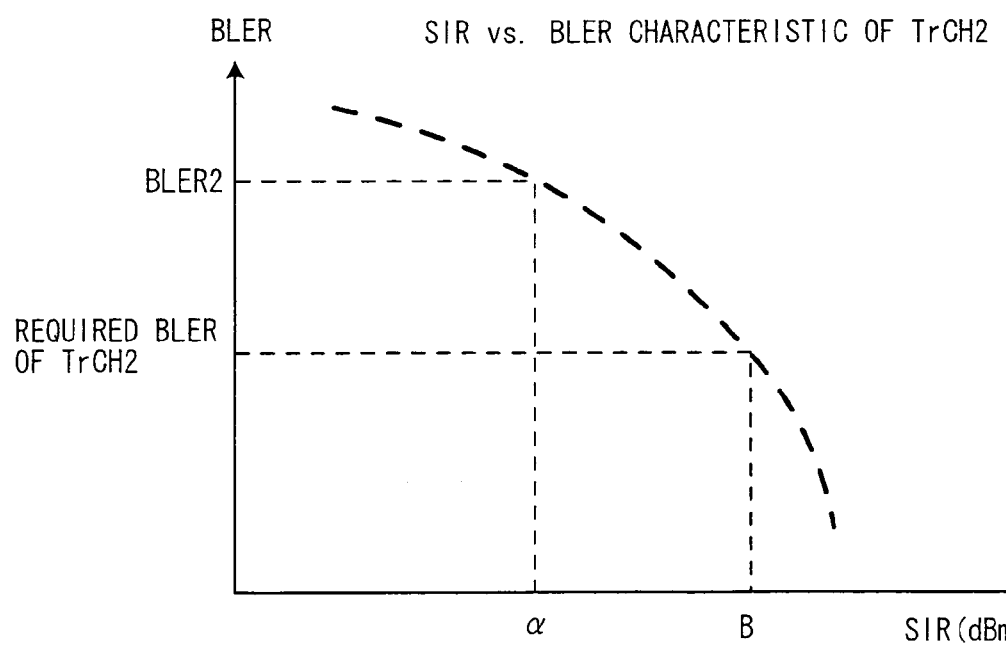
SIR vs. BLER CHARACTERISTIC OF TrCH2

FIG. 24 PRIOR ART
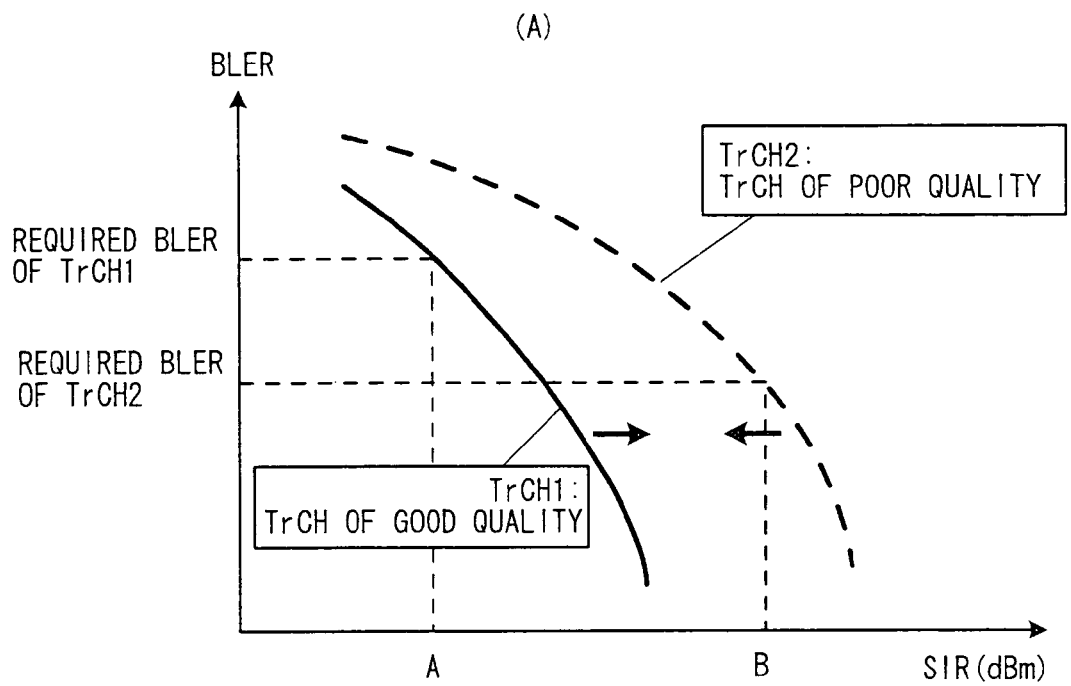
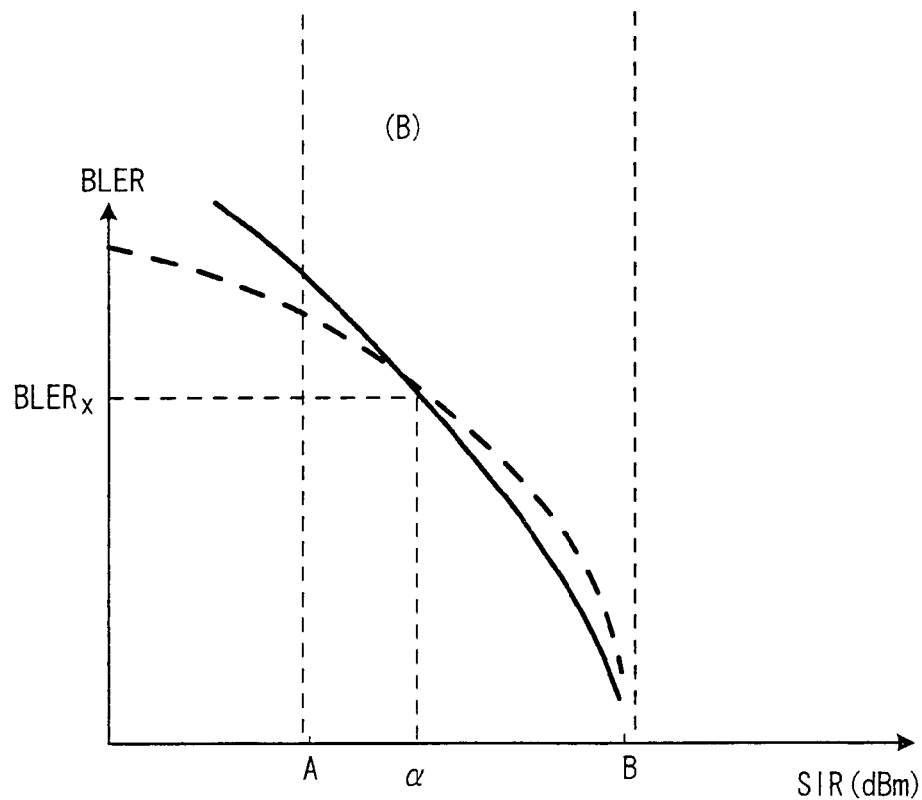

TRANSMISSION POWER CONTROL METHOD AND APPARATUS

CROSS-REFERENCE TO RELATED APPLICATION

This application is a continuation of International Application PCT/JP03/07757 filed on Jun. 19, 2003, now pending, the contents of which are herein wholly incorporated by reference.

BACKGROUND OF THE INVENTION

This invention relates to a transmission power control method and apparatus. More particularly, the invention relates to a transmission power control method and apparatus in a W-CDMA communication system, etc., for comparing the error rate of receive data and a target error rate on the receiving side, controlling a target SIR which is a target ratio of signal wave to interference wave and causing the transmitting side to control transmission power in such a manner that measured SIR will agree with the target SIR.

In order to distinguish a channel by a spreading code in W-CDMA mobile communications, multiple channels can share a single frequency band. In an actual mobile communications environment, however, a receive signal is susceptible to interference from its own channel and from other channels owing to delayed waves ascribable to multipath fading and radio waves from other cells, and this interference has an adverse influence upon channel separation. Further, the amount of interference sustained by a receive signal varies with time owing to momentary fluctuations in reception power ascribable to multipath fading and changes in the number of users communicating simultaneously. In an environment in which a receive signal is susceptible to noise that varies with time in this fashion, it is difficult for the quality of a receive signal in a mobile station linked to a base station to be maintained at a desired quality in a stable manner.

In order to follow up a change in number of interfering users and a momentary fluctuation caused by multipath fading, inner-loop transmission power control is carried out. In such control, the signal-to-interference ratio (SIR) is measured on the receiving side and the measured value is compared with a target SIR, whereby control is exercised in such a manner that the SIR on the receiving side will approach the target SIR.

Inner-Loop Transmission Power Control

FIG. 19 is a diagram useful in describing inner-loop transmission power control. Here only one channel is illustrated. A spread-spectrum modulator 1a of a base station 1 spread-spectrum modulates transmit data using a spreading code conforming to a specified channel. The spread-spectrum modulated signal is subjected to processing such as orthogonal modulation and frequency conversion and the resultant signal is input to a power amplifier 1b, which amplifies this signal and transmits the amplified signal toward a mobile station 2 from an antenna. A despreading unit 2a in the receiver of the mobile station applies despread processing to the receive signal and a demodulator 2b demodulates the receive data. A SIR measurement unit 2c measures the power ratio between the receive signal and an interference signal and a comparator 2d compares target SIR and measured SIR. If the measured SIR is greater than the target SIR, the comparator creates a command that lowers the transmission power by TPC (Transmission Power Control) bits. If the measured SIR is less than the target SIR, the comparator creates a command that raises the transmission power by the TPC bits. The target SIR is a SIR value necessary to obtain, e.g., $10^{-3}$ (error occurrence at a rate of once every 1000 times). This value is input to the comparator 2d from a target-SIR setting unit 2e. A spread-spectrum modulator 2f spread-spectrum modulates the transmit data and TPC bits. After spread-spectrum modulation, the mobile station 2 subjects the signal to processing such as a DA conversion, orthogonal modulation, frequency conversion and power amplification and transmits the resultant signal toward the base station 1 from an antenna. A despreading unit 1c on the side of the base station applies despread processing to the signal received from the mobile station 2, and a demodulator 1d demodulates the receive data and TPC bits and controls the transmission power of the power amplifier 1b in accordance with a command specified by the TPC bits.

FIG. 20 is a diagram showing the structure of a DPCH (Dedicated Physical Channel) frame of an uplink standardized by the $3^{rd}$ Generation Partnership Project (referred to as "3GPP" below). There are a DPDCH channel (Dedicated Physical Data Channel) on which only transmit data is transmitted, and a DPCCH channel (Dedicated Physical Control Channel) on which a pilot and control data such as the TPC bit information described in FIG. 19 are multiplexed and transmitted. One frame of the uplink has a duration of 10 ms and is composed of 15 slots (slot #0 to slot #14). The DPDCH channel is mapped to an orthogonal I channel of QPSK modulation, and the DPCCH channel is mapped to an orthogonal Q channel of QPSK modulation. Each slot of the DPDCH channel consists of n bits, and n varies in accordance with the symbol rate. Each slot of the DPCCH control channel that transmits the control data consists of ten bits, has a fixed symbol rate of 15 ksps and transmits a pilot PILOT, transmission power control data TPC, a transport format combination indicator TFCI and feedback information FBI.

Outer-Loop Transmission Power Control

Owing to changes in traveling velocity during communication and changes in the propagation environment ascribable to travel, the SIR that is necessary to obtain a desired quality (the block error rate, or BLER) is not constant. It should be noted that the BLER is the ratio between the total number of transport blocks (TrBk) and number of TrBks for which a CRC error has occurred over a fixed period of time.

In order to deal with these changes, the BLER is observed and control is exercised so as to increase the target SIR if the observed value of BLER is inferior to the target BLER and decrease the target SIR if the observed value of BLER is superior to the target BLER. Control that thus changes the target SIR adaptively in order to achieve the desired quality is well known as outer-loop transmission power control (outer-loop TPC).

FIG. 21 is a block diagram of well-known outer-loop control. This scheme is such that a signal that has been transmitted from a base station 3 is demodulated by a demodulator 4a and then subsequently decoded by an error-correction decoder 4b. Thenceforth, in a CRC detector 4c, the signal is split into transport blocks TrBk, after which CRC error detection is carried out on a per-TrBk basis. The result of error detection of each transport block TrBk is sent to a target-SIR controller 4d.

In W-CDMA as presently standardized, encoding is performed on the transmitting side in the manner illustrated in FIG. 22. Specifically, if a plurality (N) of transport blocks TrBk exist in a unit transmission time (Transmission Time Interval, or TTI), a CRC add-on circuit on the transmitting side generates a CRC (Cyclic Redundancy Code) error detection code for every transport block TrBk and adds this onto the transmit data. An encoder joins the N-number of transport blocks TrBk having the attached CRCs and encodes the blocks by error correcting coding such as convolutional coding or turbo coding. On the receiving side the error correcting decoder 4b subjects the receive data to error-correction decoding processing and inputs the result of decoding to the CRC detector 4c, and the CRC detector 4c performs CRC error detection for every transport block TrBk constituting the result of decoding and inputs the results of error detection to the target-SIR controller 4d.

Immediately after a dedicated channel DCH (Dedicated CH) call is placed to the target-SIR controller 4d, a host application specifies the required BLER of each service depending upon the service type of the DCH, such as voice, packet or unrestricted digital. Let $BLER_{quality}$ represent the required BLER, let Tmax represent the number of transport blocks TrBk for which BLER is measured, let Sinc (dB) represent an update quantity for raising the target SIR in a case where the measured BLER is inferior to the required BLER, and let Sdec (dB) represent an update quantity for lowering the target SIR in a case where the measured BLER is superior to the required BLER. If there is even one CRC NG (CRC error) in Tmax-number of BLER measurement periods, the target SIR is updated by Sinc. If CRC OK holds throughout, the target SIR is updated by Sdec. When this is observed in total, the target SIR settles stabilizes at a fixed level. This is the fundamental concept of outer-loop control. According to this concept, the values Sinc, Sdec and Tmax are decided so as to satisfy the following equation:

$$(1-BLER_{quality})^{Tmax} \times Sdec = [1-(1-BLER_{quality})^{Tax}] \times Sinc$$

It should be noted that $(1-BLER_{quality})^{Tmax}$ indicates the probability that the CRC check will be correct Tmax-times in succession, and $[1-(1-BLER_{quality})^{Tmax}]$ indicates the probability that there will be even one CRC check error in Tmax times.

More specifically, BLER measurement is performed with regard to Tmax-number of TrBks. If CRC OK is obtained for all TrBks, the target SIR is updated by Sdec. If there is even one CRC NG (CRC error), then the target SIR is updated by Sinc.

The values of Sinc, Sdec and Tmax are values uniquely decided by the required BLER of each service. Accordingly, in a case where a plurality of transport channels (abbreviated to "TrCH" below) have been mapped to a single physical channel (abbreviated to "PhCH" below), then values of Sinc, Sdec and Tmax will exist for each TrCH.

Standards in 3GPP

With regard to downlink transmission from a base station in 3GPP TS25.101, it is stipulated that control for lowering transmission power from the base station be carried out in a case where a transmission has been made at power above the required quality $BLER_{quality}$ of BLER and that control for raising the transmission power from the base station be carried out in a case where a transmission has been made at power below the required quality $BLER_{quality}$ of BLER. A time T1 over which quality is pulled in to the required quality of BLER at such time has been stipulated. That is, T1 interval=500 ms has been stipulated.

① Standard 1

It is necessary to pull DPCH SIR into the range −3 dB to +4 dB in order to satisfy the required BLER within the T1 time period after downlink power control is started (this is referred to as "initial pull-in").

② Standard 2

There is also a T2 interval=500 ms stipulation. It is also necessary to pull the DPCH SIR value, which has been decided by initial pull-in, into the range −3 dB to +1 dB within 500 ms following the T1 interval (this is referred to as the "steady state").

With the prior art technique, the period at which the target SIR is updated is uniquely decided after Tmax-number of BLER measurements. Consequently, if this measurement period does not fall within the T1 time period, the target SIR will not be updated from the initial target SIR in a period greater than the T1 time period, and hence there is the possibility that initial pull-in cannot be achieved as specified in Standard 1.

Conversely, in a case where the period at which the target SIR is updated is too short, the frequency at which the target SIR is updated will be high. As a result, there is the possibility that pull-in in the steady state will depart from and overshoot or undershoot the stipulated range.

③ Standard 3

Further, 3GPP TS25.101 recites a standard to the effect that measured BLER fall within a range of ±30% of the required BLER.

① Problem 1

With the prior art technique, the updating period of the target SIR and the updated value of the target SIR are decided uniquely for every required BLER specified on a pre-service basis. During the connection of a certain service, therefore, these values are fixed.

In actuality, however, the propagation environment changes from moment to moment owing to the environment in which the mobile station is placed. Consequently, in an environment in which the BLER deteriorates greatly, as when the mobile station travels in a very poor propagation environment, there is a possibility that the measured BLER will not be able to follow up Standard 3 concerning the required BLER.

② Problem 2

Furthermore, when the entire apparatus is considered, there are instances where the antenna characteristic, the characteristic of the receiver that down-converts a high-frequency signal to a baseband signal, the characteristic of the demodulator that applies despread processing to the baseband signal, and the characteristics of the various components of the decoder that applies an error correction to the symbol signal that has been despread, differ depending upon the specifications of the apparatus. Consequently, the characteristics of a certain apparatus will differ from those of an apparatus having other specifications. In other words, the BLER vs. SCR characteristic will differ depending upon the apparatus specifications, etc. For example, reception sensitivity varies depending upon whether the apparatus has whip antenna in terms of the antenna configuration, or the decoding characteristic varies owing to a disparity in soft-decision bit width in the error correcting unit, and therefore the BLER vs. SCR characteristic differs depending upon whether the apparatus has a whip antenna or because of the disparity in soft-decision bit width. Therefore, with the conventional method of controlling target SIR based upon the prescribed BLER vs. SCR characteristic, a situation arises in which the required BLER cannot be satisfied depending upon the apparatus.

③ Problem 3

In a case where a plurality of TrCHs are mapped onto a single physical channel, e.g., a case where two TrCHs TrCH1, TrCH2 are multiplexed, the SIR with respect to the required BLER (namely the BLER vs. SIR characteristic) of each TrCH differs, as illustrated at (A) and (B) of FIG. 23. That is, the SIR that satisfies the required BLER of TrCH1 is A and the SIR that satisfies the required BLER of TrCH2 is B. In a case where the TrCHs are multiplexed as is, therefore, the required qualities of both TrCHs cannot be satisfied simultaneously.

There is a 3GPP standard for solving this problem. This 3GPP standard applies weighting to a rate-matching attribute parameter (RM) to satisfy the required quality of each TrCH and makes the characteristic of a TrCH having good quality and the characteristic of a TrCH having poor quality approach each other. A method of weighting a rate-matching attribute parameter will be described with reference to (A) of FIG. 24, in which the two characteristics of (A) and (B) of FIG. 23 have been superimposed. Let the SIR that satisfies the required BLER of TrCH1 be A (dB), let the SIR that satisfies the required BLER of TrCH2 be B (dB), and let the SIR that satisfies the required BLER when both TrCHs are multiplexed be a (dB). The difference between SIR A (dB) vs. the required BLER of TrCH1 and SIR a (dB) that satisfies the required BLER when the two TrCHs are multiplexed is α−A (dB). Similarly, the difference between SIR B (dB) vs. the required BLER of TrCH2 and SIR α (dB) that satisfies the required BLER when the two TrCHs are multiplexed is B−α (dB).

Values that depart from the dB calculation of these differential values correspond to the ratio between new rate-matching attributes RM1', RM2' and rate-matching attributes RM1, RM2 prevailing prior to weighting. Accordingly, the following equations hold:

$$RM1'/RM1=10^{(\alpha-A)/10}$$

$$RM2'/RM2=10^{(B-\alpha)/10}$$

By deciding the new rate-matching attributes RM1', RM2' of TrCH1, TrCH2 so as to solve the above equations and applying weighting by these rate-matching attributes, it is possible to satisfy the required BLER for when a plurality of TrCHs having different required BLERs are multiplexed. More specifically, in a case where a plurality of TrCHs have been mapped to a single physical channel, the SIR vs. BLER characteristic of each TrCH changes as indicated at (B) of FIG. 24 owing to weighting by the above-mentioned rate-matching attributes. If we let BLERx represent the required BLER of each TrCH1, TrCH2 at the time of multiplexing, the required BLER (=BLERx) of each TrCH can be satisfied by adopting SIR (=α) vs. BLERx as the target SIR based upon (B) of FIG. 24.

However, the prior art in which the parameter α decided uniquely for the service of each TrCH is adopted as the target SIR with respect to the required BLER is such that in a case where a data transmission is performed on a low-quality TrCH alone, the required BLER of this TrCH can no longer be satisfied. That is, if data is transmitted solely by the low-quality TrCH2, α<B will hold and the required BLER of the low-quality TrCH can no longer be satisfied. It should be noted that since α>B holds, the required BLER can be satisfied with regard to TrCH1.

④ Problem 4

Furthermore, in a case where a plurality of TrCHs are multiplexed, there are instances where the standard (Standard 3) to the effect that the measured BLER fall within the range of ±30% of the required BLER is no longer satisfied. For example, in a case where the required BLER of the TrCH of a certain service is $5\times10^{-3}$, the standard range of this TrCH is $3.5\times10^{-3}$ to $6.5\times10^{-3}$, and in a case where the required BLER of the TrCH of another service is $5\times10^{-2}$, the standard range of this TrCH is $3.5\times10^{-2}$ to $6.5\times10^{-2}$. The ranges of the two standards do not overlap. In such case, Standard 3 can no longer be satisfied.

There is prior art concerning transmission power control in a mobile communication system (Patent Reference 1: Japanese Patent Application Laid-Open No. 2002-16545). According to this prior art, control entails detecting receive error rate of a receive signal; comparing the receive error rate and a target receive error rate set in advance; correcting, based upon the result of the comparison, a target reception signal power vs. interference power ratio (SIR) to serve as a target or a target reception power value to serve as a target; and controlling transmission power on the transmitting side based upon the corrected SIR or target reception power value.

Further, there is other prior art concerning transmission control (Patent Reference 2: WO 97/50197). This prior art measures the error rate of a receive signal and changes the target SIR based upon the error rate. The error rate of the receive signal is acquired by detecting a frame unit using a CRC signal or by detecting error of a known pilot signal that has been inserted at a fixed period.

However, these examples of the prior art cannot control the target SIR so as to satisfy the required BLER of apparatuses having different characteristics. Further, these examples of the prior art cannot update the target SIR and control the updating period in accordance with the propagation environment even if the propagation environment changes. The end result is that the required BLER cannot be satisfied when the propagation environment fluctuates. Furthermore, these examples of the prior art are such that even in a case where a sole TrCH is used and in a case where a plurality of TrCHs are multiplexed, the target SIR cannot be updated in such a manner that the required BLER can be satisfied. In addition, the target SIR also cannot be controlled so as to satisfy the standards.

SUMMARY OF THE INVENTION

An object of the present invention is to update target SIR and control the updating period of target SIR in accordance with the propagation environment even if the propagation environment changes, thereby making it possible to satisfy the required BLER at the time of fluctuation in propagation environment.

Another object of the present invention is to set a target SIR in such a manner that the required BLER can be satisfied irrespective of the target-SIR updating period.

A further object of the present invention is to enable updating of target SIR in such a manner that the required BLER can be satisfied even in a case where a sole TrCH is used and even in a case where a plurality of TrCHs are multiplexed.

Still another object of the present invention is to control target SIR so as to satisfy standards.

Another object of the present invention is to so arrange it that the required BLER of at least one TrCH can be satisfied if Standard 3 cannot be satisfied simultaneously for each TrCH.

The present invention is a transmission power control method for controlling a target SIR which is a target of signal to interference upon comparing error rate and target error rate of receive data on a receiving side, and causing transmission power control to be performed on a transmitting side so that measured SIR will agree with target SIR.

According to a first mode of the present invention, the method includes previously measuring and storing a correspondence characteristic between error rate (BLER) and SIR; finding a first SIR with respect to a target error rate and a second SIR with respect to a measured error rate from the characteristic; and updating the target SIR by increasing or decreasing the target SIR by the difference between the first SIR and the second SIR. In accordance with the first mode, a target SIR that satisfies the required BLER can be set irrespective of the apparatus characteristic by measuring the BLER vs. SIR characteristic. Further, the characteristic is stored beforehand in accordance with the service quality and the target SIR is updated using the characteristic that conforms to the service quality. If this arrangement is adopted, a required BLER can be satisfied for any service.

According to a second mode of the present invention, the method includes previously measuring and storing a correspondence characteristic between error rate and SIR on a per-transport-channel basis in a case where a plurality of transport channels are multiplexed and transmitted; finding, from the characteristic, a first SIR with respect to a target error rate and a second SIR with respect to a measured error rate in each transport channel in a case where a plurality of transport channels are multiplexed and transmitted; and updating the target SIR by increasing or decreasing the target SIR by the difference between the first SIR and the second SIR on a per-transport-channel basis. In accordance with the second mode, a target SIR that satisfies the required BLER can be set even at the time of multiplexed transmission by measuring the BLER vs. SIR characteristic at the time of multiplexed transmission of a plurality of TrCHs.

The second mode is such that in a case where required error-rate ranges on transport channels do not overlap, the target SIR is updated so as to satisfy the required error rate of the transport channel that requires the highest quality. If this arrangement is adopted, the required BLER can be satisfied on all TrCHs even if the required error-rate ranges do not overlap.

Further, the second mode is such that in a case where prescribed error-rate ranges on transport channels do not overlap, the target SIR is updated so as to satisfy the prescribed error rate value of the transport channel for which the lowest quality is required. If this arrangement is adopted, the required BLER can be satisfied on at least one TrCH even in a case where required error-rate ranges do not overlap. Moreover, the target SIR can be set to a low level on another TrCH and downlink power from another base station can be controlled so as to be minimized.

According to a third mode of the present invention, the method includes updating the target SIR at a first period t1 in order to pull error rate into a stipulated range of required error rates within a first stipulated time T1; and updating the target SIR at a second period t2, which is longer than the first period, after pull-in in order to make the error rate converge to within the stipulated range within a second stipulated time T2.

Specifically, the first period t1 is decided upon comparing a time, which is required to acquire a measured error rate for the purpose of comparison with the required error rate, with the first stipulated time T1, and the target SIR is updated when pull-in is performed at the first period t1. Further, the second time t2 (>t1), or α (>1), which prevails when t2=α·t1 holds, is stored in advance, and the target SIR is updated at the second period t2 after pull-in. It should be noted that in a case where the time required to acquire the measured error rate for comparison with the required error rate is greater than the first stipulated time T1, the target SIR of the initial setting is set to be high enough to satisfy the required error rate, the first period t1 is adopted as a decision period for deciding whether or not an error is present, occurrence of error is investigated at this period, the target SIR is reduced a prescribed amount if an error does not occur, and completion of pull-in is decided when an error occurs.

According to the third mode of the present invention, target SIR can be updated so as to satisfy standards.

In a fourth mode of the present invention, the method includes previously storing range of fluctuation of SIR of the second period t2 in a static environment, and shortening the second period if the actual range of fluctuation of SIR is greater then the stored range of fluctuation by more than a set value.

Further, in a fifth mode of the present invention, the method includes providing an error-rate measurement interval that is longer than the second period t2, increasing the target SIR a prescribed amount if the error rate in this interval is inferior to the required error rate by more than a set value, and decreasing the target SIR a prescribed amount if the error rate in this interval is superior to the required error rate by more than a set value.

In accordance with the fourth and fifth modes, a change in propagation environment can be followed up and target SIR controlled to thereby satisfy a required SIR even if the propagation environment deteriorates.

BRIEF DESCRIPTION OF THE DRAWINGS

FIG. 2 illustrates an example in which SIR has been acquired experimentally and tabulated, the SIR being that which makes it possible to attain an error rate $BLER_{quality}$ that prevails when $BLER_{quality}$ is varied in steps of 1 dB;

FIG. 3 illustrates an example in which SIR (SIR-AMR, SIR-UDI, SIR-PKT) has been acquired experimentally and tabulated, the SIR being that which makes it possible to attain a required error rate $BLER_{quality}$ on a per-service basis;

FIG. 16 is a diagram for describing a standard of unlimited digital data in a case applied to a fourth embodiment;

FIG. 23 is a characteristic of required BLER vs. SIR (a BLER vs. SIR characteristic) of each TrCH; and FIG. 24 is a BLER vs. SIR characteristic in a case where two characteristics have been superimposed.

DESCRIPTION OF THE PREFERRED EMBODIMENTS

(A) First Embodiment

Figure 1:
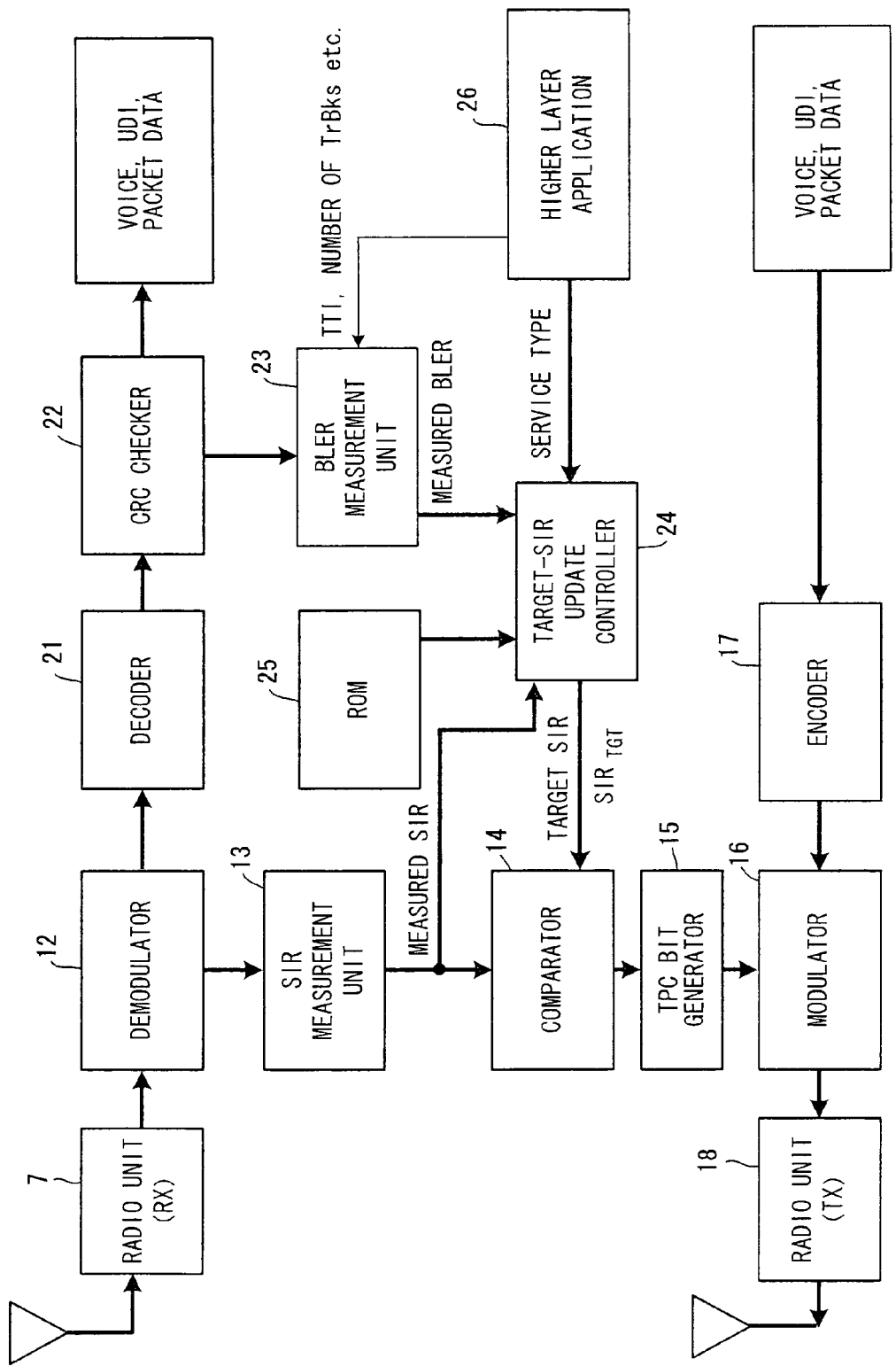
FIG. 1 is a diagram illustrating the structure of a transmission power control apparatus in a mobile station according to a first embodiment.

FIG. 1 is a diagram illustrating the structure of a transmission power control apparatus in a mobile station according to a first embodiment.

A radio unit 11 in a mobile station receives a signal from a base station, subjects the signal to a frequency conversion and orthogonal detection to obtain a baseband signal and inputs the signal to a demodulator 12. A despreader in the demodulator 12 subjects the receive signal to despread processing to despread the signal and obtain symbol data. A SIR measurement unit 13 measures the ratio (SIR) between the desired power level of the receive signal that has undergone despreading and the interference power level at this time. A comparator 14 compares the target SIR ($=SIR_{TGT}$) and measured SIR. If the measured SIR is greater than the target SIR, a TPC bit generator 15 creates a command that lowers the transmission power by TPC bits. If the measured SIR is less than the target SIR, on the other hand, the TPC bit generator 17 creates a command that raises the transmission power by the TPC bits. A spread-spectrum modulator in a modulator 16 spread-spectrum modulates the transmit data (voice, UDI, packet data, etc.), which has been encoded by an encoder 17, and the TPC bits. A radio unit 18 subjects the spread-spectrum modulated signal to processing such as orthogonal modulation, frequency conversion and power amplification and transmits the resultant signal toward the base station from an antenna. The base station applies despread processing to the signal received from mobile station 2, demodulates the receive data and TPC bits and controls the transmission power of a transmission power amplifier in accordance with a command specified by the TPC bits. The foregoing is inner-loop control.

In parallel with inner-loop control, a decoder 21 subjects the demodulated data (symbol data having a soft-decision bit width) to deinterleave processing and error-correction decode processing that is based upon Viterbi decoding or turbo decoding, restores repetitious or punctured bits to the original by rate matching processing and inputs the results of decoding to a CRC checker (CRC detector) 22.

The CRC detector 22 performs CRC error detection for every transport block TrBk constituting the results of decoding and inputs the result of error detection to a BLER measurement unit 23. The latter measures the error rate [measured BLER=(number of erroneous blocks)/(total number of blocks)] in a predetermined time period and inputs the measured error rate to a target-SIR update controller 24. The target-SIR update controller 24 finds SIR ($=SIR2$) with respect to required BLER and SIR ($=SIR1$) with respect to measured BLER from a BLER vs. SIR characteristic registered previously in a ROM 25, increases or decreases target SIR ($=SIR_{TGT}$) by the difference $\Delta SIR$ between SIR2 and SIR1 ($SIR_{TGT}=SIR_{TGT}+\Delta SIR$) and sets this target SIR in the comparator 14. It should be noted that according to standards, it will suffice if measured BLER is within ±30% of the required BLER. Accordingly, if measured BLER is within ±30% of the required BLER, then control can also be exercised so as not to increase or decrease the target SIR ($=SIR_{TGT}$).

Storage of BLER vs. SIR Characteristic

The characteristic (BLER vs. SIR characteristic) of correspondence between the required error rate $BLER_{quality}$ of a mobile terminal and the SIR that enables this error rate $BLER_{quality}$ to be attained has been measured and stored in the ROM 25. FIG. 2 illustrates an example in which SIR has been acquired experimentally and tabulated, the SIR being that which makes it possible to attain an error rate $BLER_{quality}$ that prevails when $BLER_{quality}$ is varied in steps of 1 dB. In actuality, an AMR voice service, UDI service and packet service are available as services, and the BLER vs. SIR characteristic differs for each service. For this reason, SIR (SIR-AMR, SIR-UDI, SIR-PKT) that makes it possible to attain a required error rate $BLER_{quality}$ on a per-service basis is acquired experimentally, tabulated and stored, as illustrated in FIG. 3.

Further, in a case where a plurality of TrCHs have been multiplexed onto a single physical channel, weighting of a rate-matching attribute is performed in order to simultaneously satisfy the required BLERs of TrCHs of different services. As a consequence of this processing, the BLER vs. SIR characteristic of each service at the time of a sole TrCH will differ from that when a plurality of TrCHs are multiplexed. Accordingly, the BLER vs. SIR characteristic of every combination of a plurality of services is measured in advance, tabulated and stored in the ROM 25 (see SIR-multi in FIG. 3). Since a service in which voice data and packets are multiplexed and transmitted is currently being performed, the SIR (SIR_Multi) that enables the required error rate $BLER_{quality}$ to be attained is acquired experimentally, tabulated and stored with regard to a case where a voice TrCH and a packet TrCH are multiplexed. It should be noted that in a case where the characteristics of the voice TrCH and packet TrCH differ at the time of this weighted multiplexing, the characteristics of each of these TrCHs are stored.

Thus, the target-SIR update controller 24 finds SIR ($=SIR2$) with respect to the required BLER and SIR ($=SIR1$) with respect to the measured BLER using the BLER vs. SIR characteristic conforming to service type entered from a separate higher-order layer application 26, increases or decreases the target SIR ($=SIR_{TGT}$) by the difference $\Delta SIR$ ($=SIR2-SIR1$) between SIR2 and SIR1, thereby updating the target SIR, and sets this target SIR in the comparator 14.

Method of Acquiring BLER vs. SIR Characteristic

Figure 4:
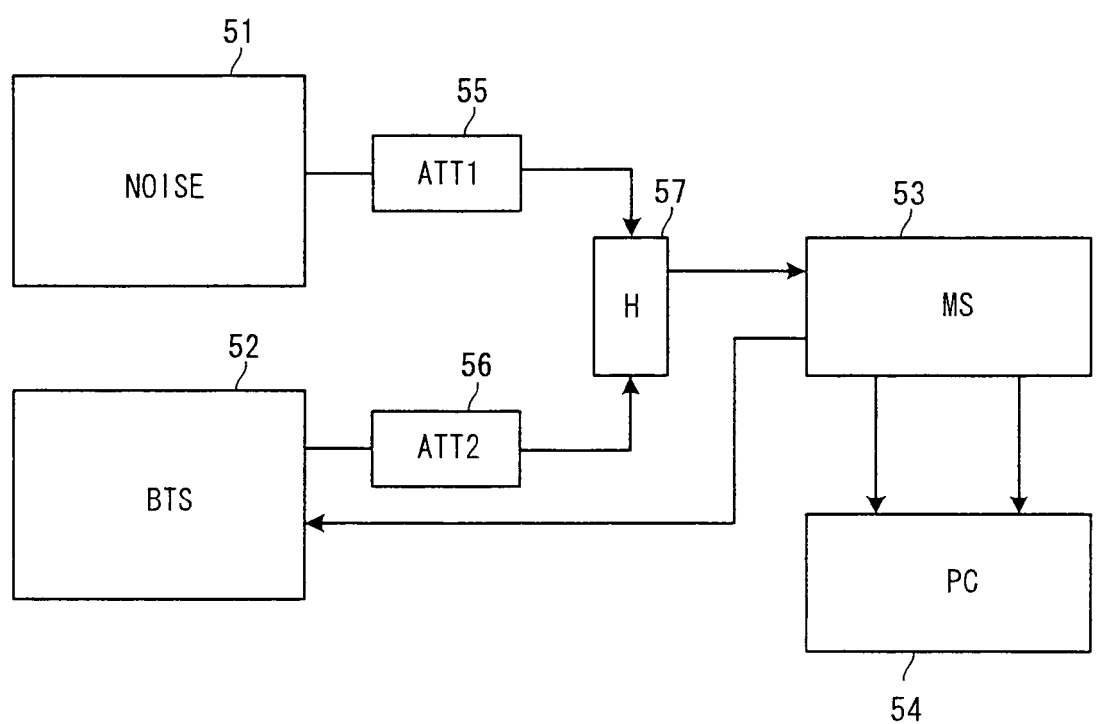
FIG. 4 is a diagram illustrating an arrangement for acquiring a BLER vs. SIR characteristic.

FIG. 4 is a diagram illustrating an arrangement for acquiring a BLER vs. SIR characteristic. Reference numeral 51 denotes an interference generator, 52 a base station simulator (BTS), 53 a mobile station (MS), 54 a personal computer (PC), 55 and 56 attenuators (level adjusters) and 57 a combiner. An up/down-signal link between the base station simulator 52 and mobile station 53 is connected by wire in order to prevent interference from other systems, the attenuator 56 is connected to a down-signal link from the base station simulator 52 to the mobile station 53, and the desired-wave signal level is made adjustable. Further, the attenuator 55 is connected to the output from the interference generator 51 and the interference signal level is made adjustable. The desired wave and interference wave are combined by the combiner 57 and input to the mobile station 53 as a downlink signal. Furthermore, the mobile station 53 outputs the BLER measurement value and SIR measurement value of the downlink signal to the personal computer 54, and the values of these signals can be monitored on the side of the personal computer.

When the BLER vs. SIR characteristic is acquired, the desired wave level is adjusted by the attenuator 56 and the interference wave level is adjusted by the attenuator 55 to thereby adjust the level of the SIR. Further, the setting of service type (AMR, UDI, packet, multicall, etc.) sent and received between the base station simulator and mobile station is performed by setting the base station simulator 52. After finalization of the SIR level by the attenuator adjustment and the finalization of service type by the setting of the base station simulator, data is sent and received with regard to a certain service and the personal computer 54 monitors the BLER measurement value and SIR measurement value of the mobile station 53. Thus, the SIR measurement value and BLER measurement value at one point can be acquired, after which attenuator adjustment is made in stages to acquire SIR measurement values and BLER measurement values at a plurality of points. As a result, the BLER vs. SIR characteristic of a prescribed service can be acquired. Similarly, the BLER vs. SIR characteristics of other services and multicall are acquired and set in the ROM 25 of FIG. 1.

Linear Approximation of BLER vs. SIR Characteristic

Figures 5, 6:
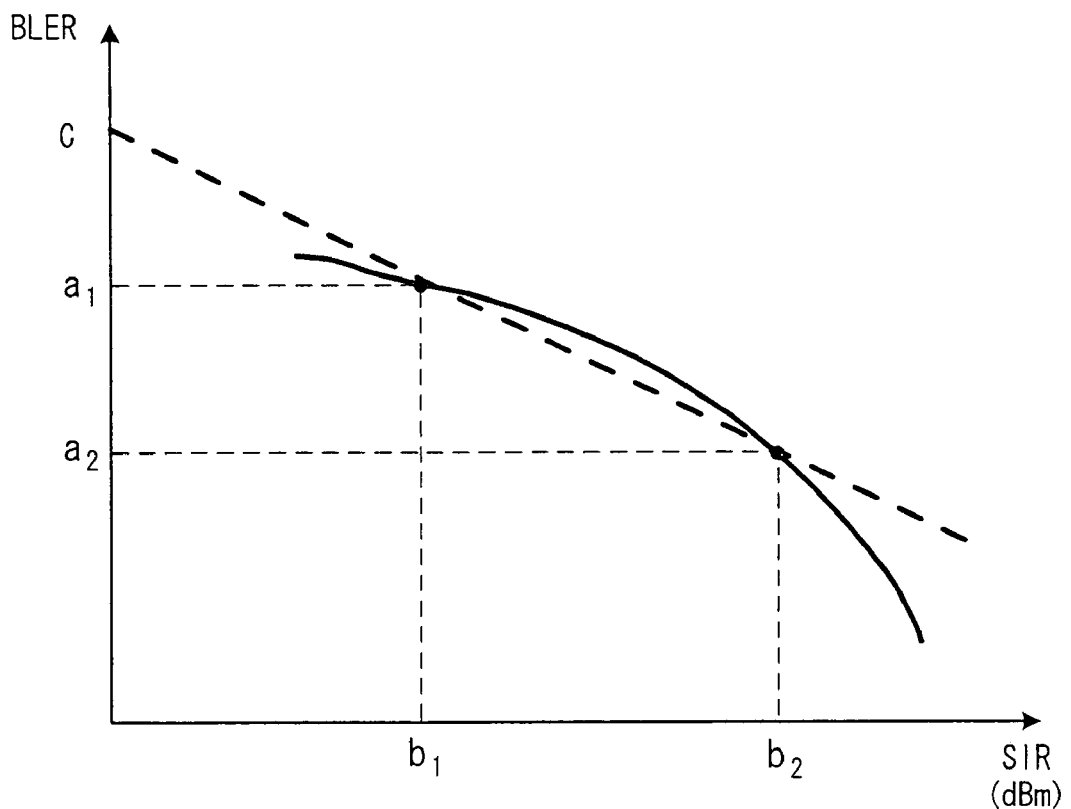
FIG. 5 is a diagram useful in describing a linear approximation.
FIG. 6 illustrates an example of two types of service.

The foregoing is a case where BLER and the SIR at such time are stored in steps of, e.g., 1 dB, with regard to the BLER vs. SIR characteristic. However, the BLER vs. SIR characteristic can also be stored upon performing a linear approximation in simple fashion. FIG. 5 is a diagram useful in describing a linear approximation. Here only the data at two points on the BLER vs. SIR characteristic is stored, and the target SIR with respect to the required BLER is calculated from the slope and the height of BLER when SIR=0 holds. By way of example, assume that the BLER vs. SIR (dB) data at the first point is a1, b1 (dBm), and that the data at the second point is a2, b2 (dBm). In such case, the slope is as follows:

$$(a2-a1)/10^{(b2-b1)/10}$$

Furthermore, if we substitute c for a converging BLER when SIR=0 holds, then the following equation will hold:

$$BLER = (a2-a1)/10^{(b2-b1)/10} \times SIR + c$$

Accordingly, SIR2 is calculated from the required $BLER_{quality}$ by the above equation, SIR1 is similarly calculated from the measured BLER and the target SIR (=$SIR_{TGT}$) is updated based upon the difference.

Method of Deciding Target SIR Updating Periods t1, t2 for Satisfying Standards

In order to satisfy the initial pull-in of 500 ms, the required BLER and the SIR of measured BLER are each found from the BLER vs. SIR characteristic when the total number of TrBks for which BLER can be measured in each service is attained, and processing for updating the target SIR is executed.

If the time in which the required BLER can be measured is not within 500 ms, then the initial value of the target SIR is set sufficiently higher than a value (at which CRC OK is achieved) at which the required BLER can be satisfied and a CRC check is performed at the TTI (Transmission Time Interval). If a CRC error is detected, initial pull-in ends and it is considered that the steady state has been attained.

By way of example, consider the two types of service illustrated in FIG. 6.

In the case of a packet, a total number of TrBks equal to or greater than $1/(3.5 \times 10^{-2}) = 29$ is necessary in order to measure the lower limit 3.5E−02 (=$3.5 \times 10^{-2}$) of the standard. In the initial state, the packet is TTI=10 ms and the numbers of TrBks per TTI are 0, 1, 2, 4, 8 and 12. If we consider the case of the maximum number of 12, the number will be equal to or greater than 29 at 3TTI=30 ms. The period of 30 ms is sufficiently short with respect to the standard time of 500 ms for pull-in. Accordingly, 30 ms is adopted as the target-SIR updating period t1 at the time of initial pull-in. BLER is measured every 30 ms, SIR (=SIR1) conforming to the measured BLER and SIR (=SIR2) at the time of the required BLER are found from the BLER vs. SIR characteristic of the packet service, the difference ΔSIR is adopted as the updating value of the target SIR (=$SIR_{TGT}$), and $SIR_{TGT} = SIR_{TGT} + \Delta SIR$ is input to the comparator 14 (FIG. 1) as the new target SIR.

After the transition is made to the steady state, the target-SIR updating period t2 is made 30×αpkt (t2=t1×αpkt). The period t2 or coefficient αpkt (>1) is decided in advance and stored in the ROM. The coefficient αpkt is decided to have a value that adheres to the stipulation of the standard time T2 in 3GPP. It is obtained by performing an experiment during normal running time in the static state, with t2 falling within 30 to 500 ms.

BLER is measured every target-SIR updating period t2, SIR (=SIR1) conforming to the measured BLER and SIR (=SIR2) at the time of the required BLER are found from the BLER vs. SIR characteristic of the packet service, the difference ΔSIR is adopted as the updating value of the target SIR (=$SIR_{TGT}$), and $SIR_{TGT} = SIR_{TGT} + \Delta SIR$ is input to the comparator 14 (FIG. 1) as the new target SIR.

In case of AMR, a total number of TrBks equal to or greater than $1/(3.5 \times 10^{-3}) = 286$ is necessary in order to measure the lower limit 3.5E−03 (=$3.5 \times 10^{-3}$) of the standard. In the initial state, voice is TTI=20 ms and the number of TrBks per TTI is one. BLER measurement time therefore is 286×20 ms=5720 ms, and this is greater than the standard time of 500 ms of initial pull-in. Consequently, the initial value of the target SIR is started from a sufficiently high value, the target-SIR updating time t1 is made 20 ms, which is the CRC check period, a CRC check is performed every 20 ms, and monitoring is performed to determine whether a CRC error has occurred. If a CRC error has not occurred, then the target SIR is decreased a prescribed amount. The moment at which a CRC error has occurred is judged to be the end of initial pull-in (this is the initial state).

After the transition is made to the steady state, the updating period t2 is made 20×αamr (t2=t1×αamr). The period t2 or coefficient αamr (>1) is decided in advance and stored in the ROM. The coefficient αamr is decided in a range in which the stipulation of the standard time T2 in 3GPP is obeyed. It is obtained by performing an experiment during normal running time in the static state, with t2 falling within 20 to 500 ms. If a CRC error occurs, the target SIR is updated on the + side; if a CRC error does not occur, the target SIR is updated on the − side.

First Processing Flow

Figure 7:
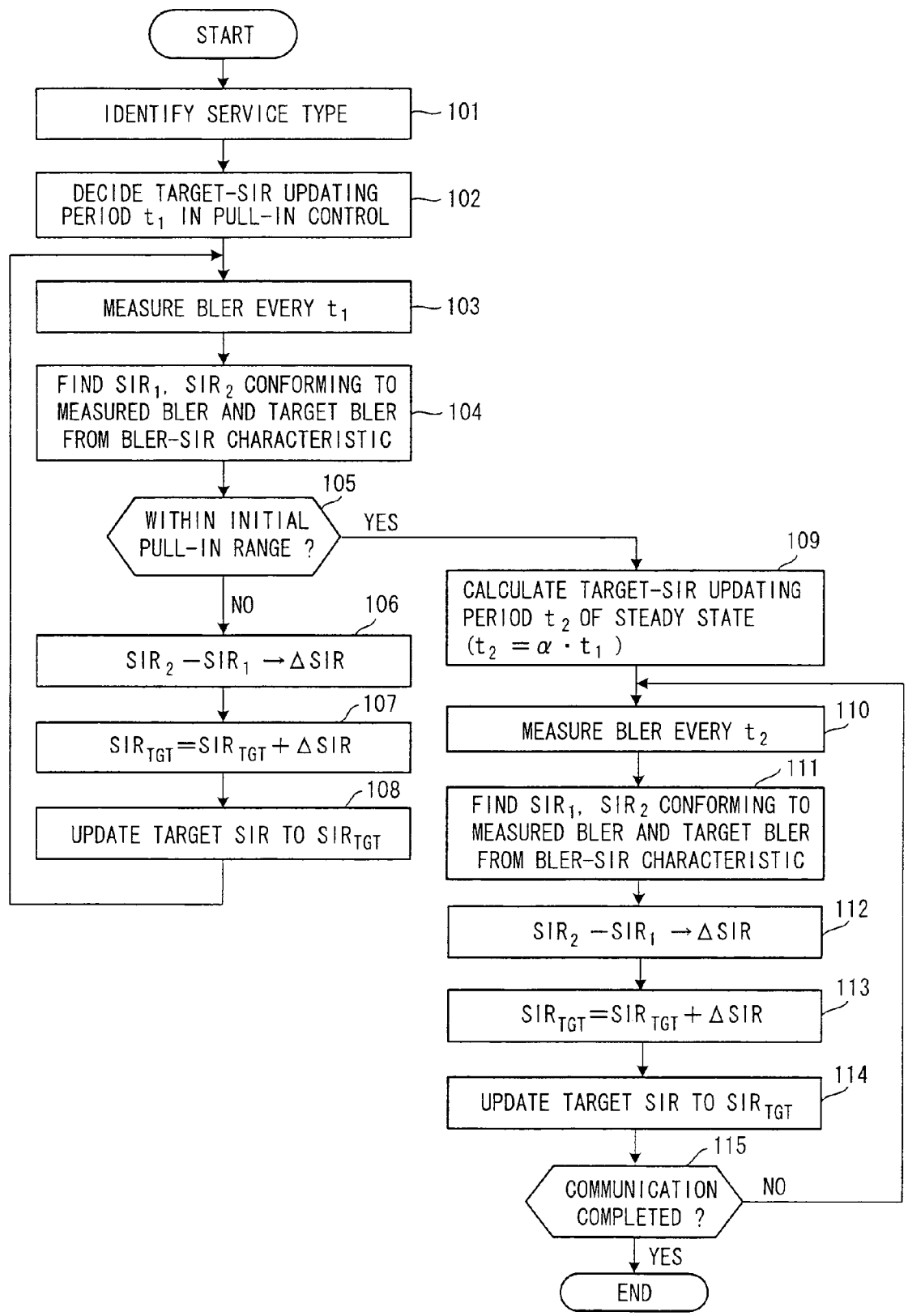
FIG. 7 is a flowchart of processing for updating target SIR in the first embodiment.

FIG. 7 is a flowchart of processing for updating target SIR in the first embodiment. This is a case where the time needed to acquire the measured BLER is less than the stipulated time T1 of 3GPP Standard 1.

Based upon service-type information that enters from the higher layer application 26, the target-SIR update controller 24 determines whether communication is TrCH multiplexed communication or TrCH individual communication. If communication is TrCH individual communication, the target-SIR update controller 24 identifies the content of the service, finds the SIR conforming to the required BLER using the BLER vs. SIR characteristic that conforms to the service type, and sets this SIR in the comparator 14 as the target SIR (step 101). Based upon the TTI, the number of TrBks (number of blocks) per TTI and required BLER that enter from the higher layer application 26, the BLER measurement unit 23 calculates the measurement time necessary to measure the BLER, verifies that the measurement time is less than the pull-in stipulated time T1 (=500 ms) of the 3GPP standard and adopts this measurement time as the target-SIR updating period t1 in the pull-in state (step 102).

The BLER measurement unit 23 thenceforth measures BLER every updating period t1 and inputs the result to the target-SIR update controller 24 (step 103).

Using the BLER vs. SIR characteristic conforming to the type of service, the target-SIR update controller 24 finds the SIR (=SIR2) with respect to the required BLER and the SIR (=SIR1) with respect to the measured BLER (step 104). A check is performed to determine whether SIR (=SIR1) with respect to the measured BLER is within the pull-in range (−3 dB to +4 dB) of 3GPP Standard 1 (step 105). If the SIR is not within this range, then the difference ΔSIR between SIR2 and SIR1 is calculated, the target SIR (=$SIR_{TGT}$) is increased or decreased by $SIR_{TGT}=SIR_{TGT}+\Delta SIR$ to thereby update the target SIR, this is set in the comparator 14 (steps 106 to 108) and processing from step 103 onward is repeated.

If it is found at step 105 that the SIR is within the pull-in range (−3 dB to +4 dB) of 3GPP Standard 1, there is a transition to the steady state and the BLER measurement unit 23 calculates the steady-state target-SIR updating period t2 in accordance with the following equation:

$$t2=t1 \times \alpha$$

(step 109). It should be noted that α is αpkt in case of the packet mode, αamr in case of the AMR voice service, and αudi in case of the unlimited digital service, and has been registered in the ROM 24 in advance.

The BLER measurement unit 23 thenceforth measures BLER every updating period t2 and inputs the results to the target-SIR update controller 24 (step 110).

Using the BLER vs. SIR characteristic conforming to the type of service, the target-SIR update controller 24 finds the SIR (=SIR2) with respect to the required BLER and the SIR (=SIR1) with respect to the measured BLER (step 111), calculates the difference ΔSIR between SIR2 and SIR1, updates the target SIR (=$SIR_{TGT}$) by $SIR_{TGT}=SIR_{TGT}+\Delta SIR$ and sets the result in the comparator 14 (steps 112 to 114). The target-SIR update controller 24 thenceforth checks to determine whether communication has been completed (step 115). If communication has not ended, then processing from step 110 onward is repeated.

First Processing Flow

Figure 8:
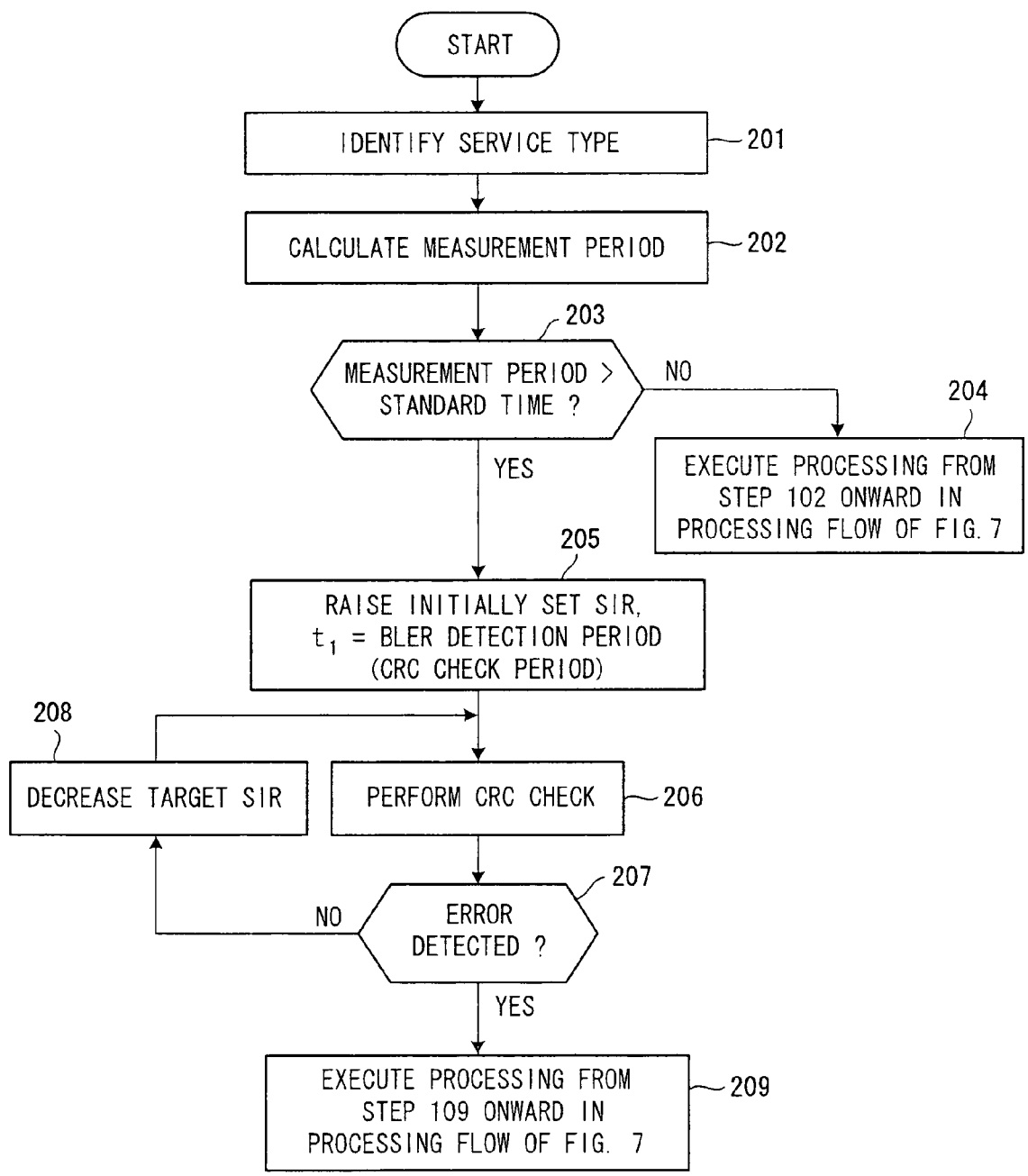
FIG. 8 is a second flowchart of processing for updating target SIR in the first embodiment.

FIG. 8 is a second flowchart of processing for updating target SIR in the first embodiment. This is a processing flowchart for case where the time needed to acquire the measured BLER is greater than the stipulated time T1 of 3GPP Standard 1.

Based upon service-type information that enters from the higher layer application 26, the target-SIR update controller 24 determines whether communication is TrCH multiplexed communication or TrCH individual communication. If communication is TrCH individual communication, the target-SIR update controller 24 identifies the content of the service, finds the SIR conforming to the required BLER using the BLER vs. SIR characteristic that conforms to the service type, and sets this SIR in the comparator 14 as the target SIR (step 201).

Further, based upon the TTI, the number of TrBks (number of blocks) per TTI and required BLER that enter from the higher layer application 26, the BLER measurement unit 23 calculates the measurement time necessary to measure the BLER (step 202), verifies whether the measurement time is greater than the pull-in stipulated time T1 (=500 ms) of the 3GPP standard, adopts this measurement time as the target-SIR updating period t1 in the pull-in state if the measurement time is shorter than the stipulated time T1 and executes processing from step 107 onward in FIG. 7 (step 204).

On the other hand, if it is found at step 203 that the measurement time is greater than the stipulated time T1, then the BLER measurement unit 23 starts the initial value of target SIR from a sufficiently high value, adopts the target-SIR updating period t1 as the CRC check period (=TTI) (step 205), performs the CRC check every TTI period (step 206) and performs monitoring to determine whether a CRC error has occurred (step 207). If a CRC error has not occurred, the BLER measurement unit 23 decreases the target SIR a prescribed amount (step 208). If a CRC error occurs, on the other hand, then the BLER measurement unit 23 judges that this moment is the end of initial pull-in and subsequently executes processing from step 109 onward in FIG. 7 (step 209).

(B) Second Embodiment

If the traveling speed of a mobile station is high, there is frequently interference between cells and there is influence from the propagation environment, such as multipath fading. Hence there is the possibility that a decline in BLER owing to SIR fluctuation will occur, as a result of which the required BLER cannot be satisfied. Consequently, if SIR fluctuation arises owing to the propagation environment, it is necessary to make the target SIR follow up such fluctuation momentarily by control for updating the target SIR. Accordingly, in the second embodiment, a fluctuation in the result of measuring the SIR of a receive signal per certain fixed time is monitored, the target-SIR updating period t2 is shortened if the range of fluctuation of SIR is greater than a set value and, conversely, is made long if the range of fluctuation of SIR is small.

Figure 9:
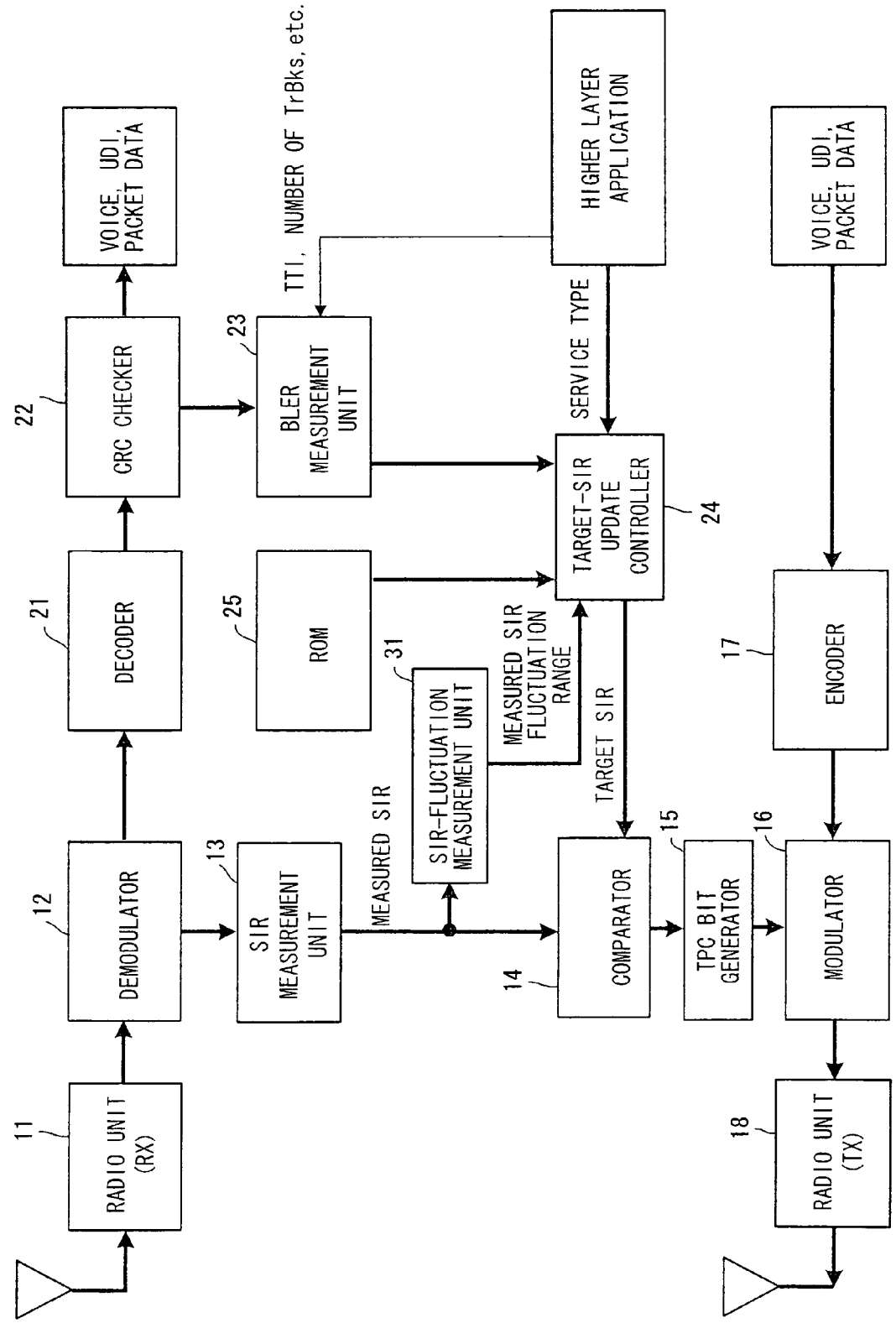
FIG. 9 is a diagram illustrating the structure of a transmission power control apparatus in a mobile station according to a second embodiment.

FIG. 9 is a diagram illustrating the structure of a transmission power control apparatus according to a second embodiment, in which components identical with those of the first embodiment in FIG. 1 are designated by like reference characters. This embodiment differs in that ① a SIR-fluctuation measurement unit 31 is provided and measures the SIR fluctuation of a receive signal in a fixed time period; ② a measurement value of the range of SIR fluctuation has been stored in the ROM 25; and ③ the SIR updating period t1 is controlled to vary based upon the magnitudes of the measured SIR fluctuation and set value.

By way of example, in a packet service in a static environment, assume that SIR fluctuation is measured at the SIR updating period t2 [=30×αpkt(ms)], that the range of fluctuation is ΔSIRpkt_static(dB), and that this value has been stored in the ROM 25 in advance. After a transition is made to the steady state following the establishment of a packet call, the SIR-fluctuation measurement unit 31 measures the SIR fluctuation range ΔSIRpkt(dB) in the steady state every updating period t2 and inputs the result to the target-SIR update controller 24.

The target-SIR update controller 24 calculates the difference between the SIR fluctuation range ΔSIRpkt_static(dB) in the static state and the SIR fluctuation range ΔSIRpkt during actual communication, and checks to see whether the difference (ΔSIRpkt−ΔSIRpkt_static) is equal to or greater than, e.g., 3 dB. If the difference is on the order of 3 dB, then the target-SIR update controller 24 judges that the range of SIR fluctuation during actual communication is about twice that of the static state and halves the updating period t2

[makes the period (30×αpkt)/2 (ms)] in order to make updating of the target SIR follow up the fluctuation in SIR. As a result, updating of the target SIR is hastened and it is possible for the target SIR to follow up SIR fluctuation that is due to a change in the propagation environment.

When the range of fluctuation becomes small, the original updating period (30×αpkt) is restored. Further, depending upon the service, there are instances where bursts are received, and there are services having a state in which there is no data. With regard to such a service, BLER measurement is performed substantially during the reception of data so as not to count the total number of TrBks and number of CRC error TrBks of BLER measurement in a state in which data is not being received, the SIR conforming to this measured BLER is found, the range of SIR fluctuation is found and then the above-described control is carried out.

Further, the control operation for updating target SIR in the first embodiment and control of updating-period fluctuation in the second embodiment are performed concurrently for the purpose of following up a change in the propagation environment momentarily.

Figure 10:
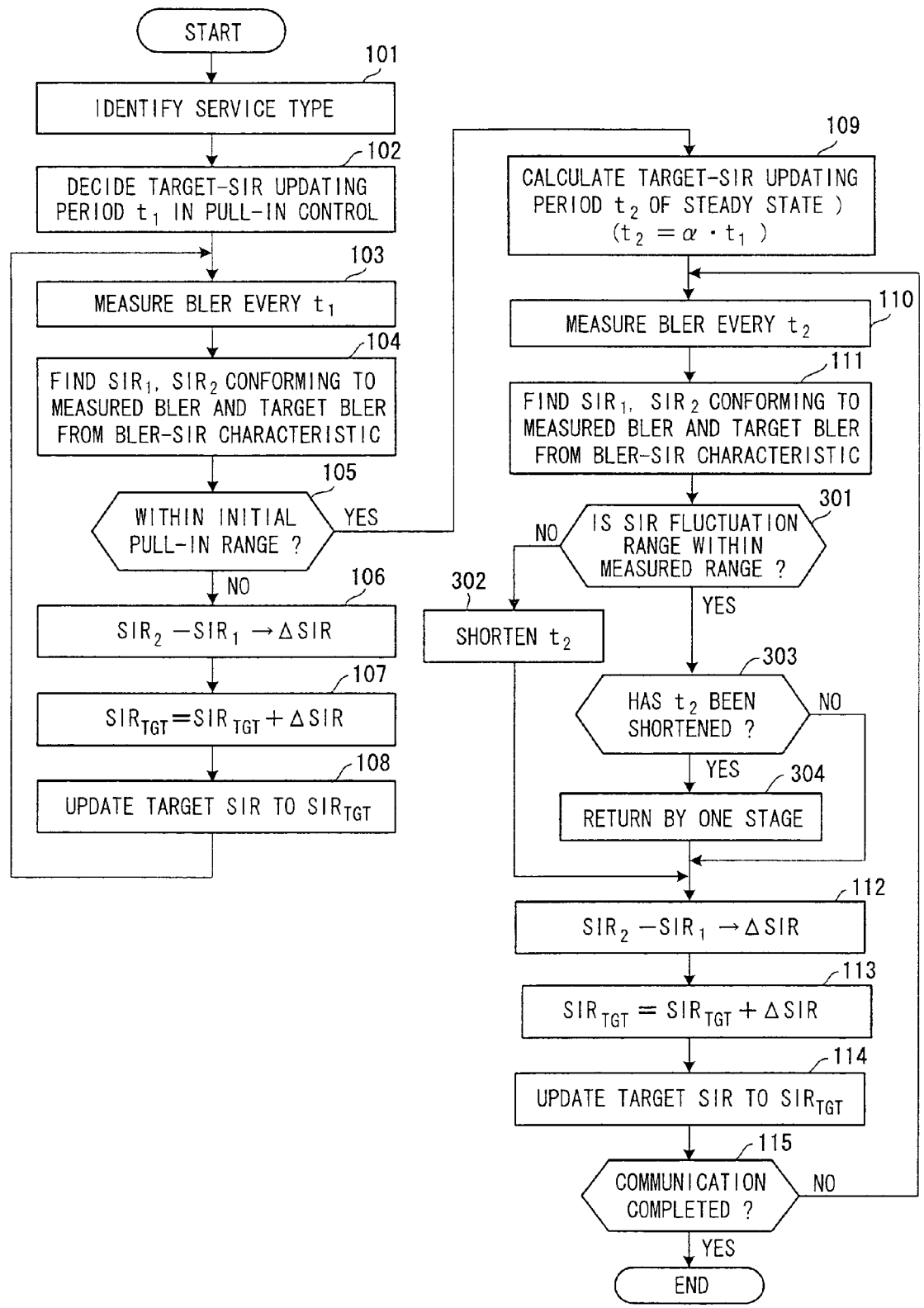
FIG. 10 is a flowchart of processing according to the second embodiment.

FIG. 10 is a flowchart of processing according to the second embodiment, in which processing steps identical with those of the processing flowchart of FIG. 7 in the first embodiment are designated by like step numbers. A first difference in this processing is that when the SIR (=SIR1) conforming to the measured BLER is found at step 111, the range of SIR fluctuation in the updating period t2 is found, a check is performed to determine whether the range of fluctuation has exceeded a set range that has been set in the ROM 25 (step 301), the updating period t2 is halved (step 302) if the set range has been exceeded, and processing from step 112 onward is executed. A second difference in this processing is that if the measured range of SIR fluctuation is within the set limits, a check is performed to determine whether the updating period t2 was in the shortened state up to this point (step 303), processing from step 112 onward is executed if the updating period t2 is not in the shortened state, and the updating period t2 is returned to the immediately preceding stage and processing from step 112 onward is executed if the updating period t2 is in the shortened state (step 304).

(C) Third Embodiment

In a case where a plurality of TrCHs have been multiplexed onto a single physical channel (PhCH) (i.e., in the case of a multicall), weighting of a rate-matching attribute is performed in order to simultaneously satisfy the required BLERs of TrCHs of different services. As a consequence of this processing, the BLER vs. SIR characteristic of each service at the time of a sole TrCH will differ from that when a plurality of TrCHs are multiplexed. Accordingly, the BLER vs. SIR characteristic of every combination of a plurality of services is measured in advance, tabulated and stored in the ROM 25 (see SIR-multi in FIG. 3).

Figure 11:
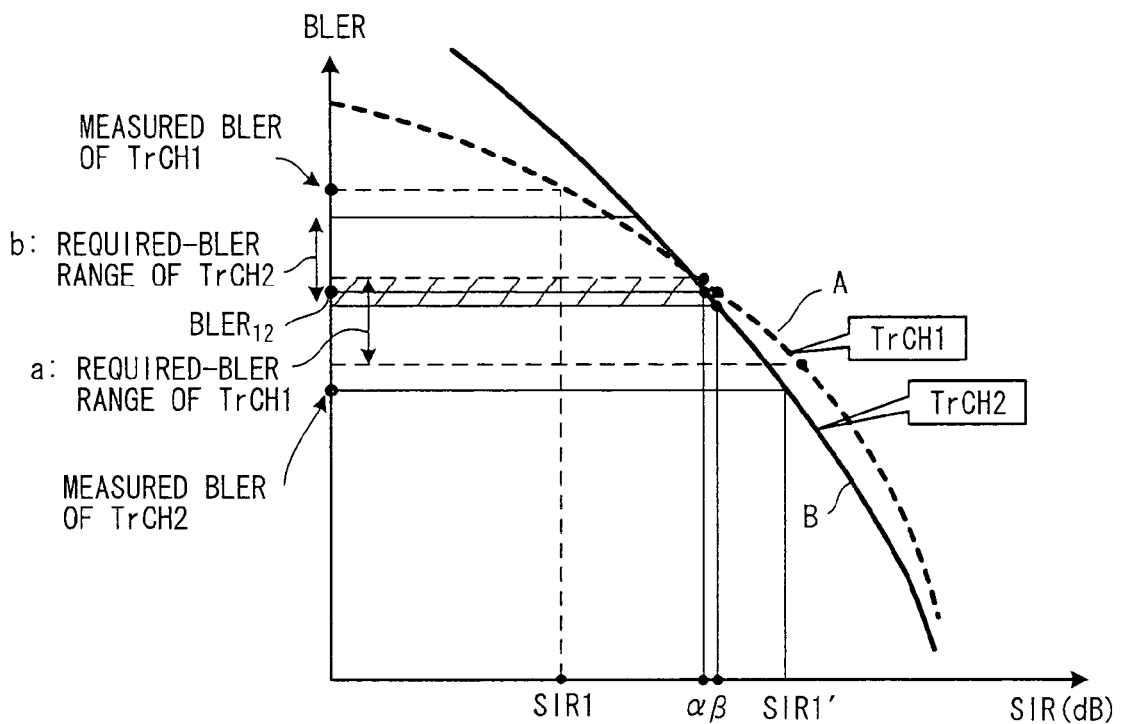
FIG. 11 is a first explanatory view of a third embodiment in a case where two TrCHs are multiplexed and transmitted.

In a case where the BLER vs. SIR characteristics of respective ones of two multiplexed services agree owing to processing for weighting a rate-matching attribute, only the one BLER vs. SIR characteristic for which agreement is obtained need be stored. In usual practice, however, the characteristics do not agree perfectly, as illustrated in FIG. 11. Accordingly, usually the BLER vs. SIR characteristic of each service is stored individually for every type of service combination. The third embodiment is transmission power control in a case where a plurality of TrCHs of different services are multiplexed and transmitted. The structure of the transmission power control apparatus for realizing the third embodiment is the same as that of FIG. 1.

Control when Required-BLER Ranges of Multiplexed TrCHs Overlap

In a case where required-BLER ranges a and b of a TrCH1 of a certain service and of a TrCH2 of another service overlap (the shaded area), as shown in FIG. 11, a $BLER_{12}$ within the zone of overlap is adopted as the required BLER of TrCH1, TrCH2.

The BLER measurement unit 23 (FIG. 1) inputs the measured BLER of every multiplexed TrCH (TrCH1, TrCH2) to the target-SIR update controller 24 at the SIR updating period.

When the measured BLER of TrCH1 is input thereto, the target-SIR update controller 24 finds the SIR (=SIR1) that conforms to the measured BLER from a BLER vs. SIR characteristic A (see FIG. 11) corresponding to the service of TrCH1 at the time of multiplexing, finds the SIR (=β) of the required BLER ($BLER_{12}$), finds the new target SIR ($SIR_{TGT}$) according to the following equation using the difference $\Delta SIR$ (=β−SIR1) between these:

$$SIR_{TGT}=SIR_{TGT}+\Delta SIR$$

and inputs the new target SIR to the comparator 14.

Further, when the measured BLER of TrCH2 is input thereto, the target-SIR update controller 24 finds the SIR (=SIR1′) that conforms to the measured BLER from a BLER vs. SIR characteristic B (see FIG. 11) corresponding to the service of TrCH2 at the time of multiplexing, finds the SIR (=α) of the required BLER ($BLER_{12}$), finds the new target SIR ($SIR_{TGT}$) according to the following equation using the difference $\Delta SIR'$ (=α−SIR1′) between these:

$$SIR_{TGT}=SIR_{TGT}+\Delta SIR'$$

and inputs the new target SIR to the comparator 14. It should be noted that it is also possible to adopt an arrangement in which a new target SIR is found according to the following equation:

$$SIR_{TGT}=SIR_{TGT}+(\Delta SIR+\Delta SIR')$$

using a value ($\Delta SIR+\Delta SIR'$) that is the result of combining the differential $\Delta SIR$ of TrCH1 and the $\Delta SIR'$ of TrCH2.

First Control when Required-BLER Ranges of Multiplexed TrCHs do not Overlap

Figure 12:
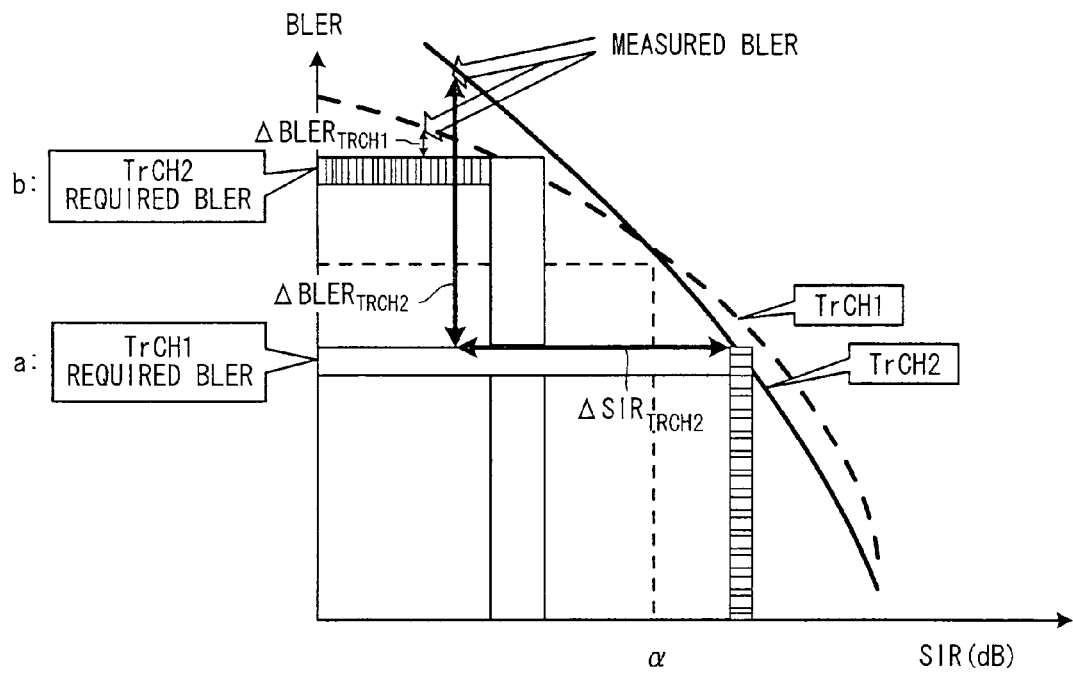
FIG. 12 is a second explanatory view of the third embodiment in a case where two TrCHs are multiplexed and transmitted.
Figure 13:
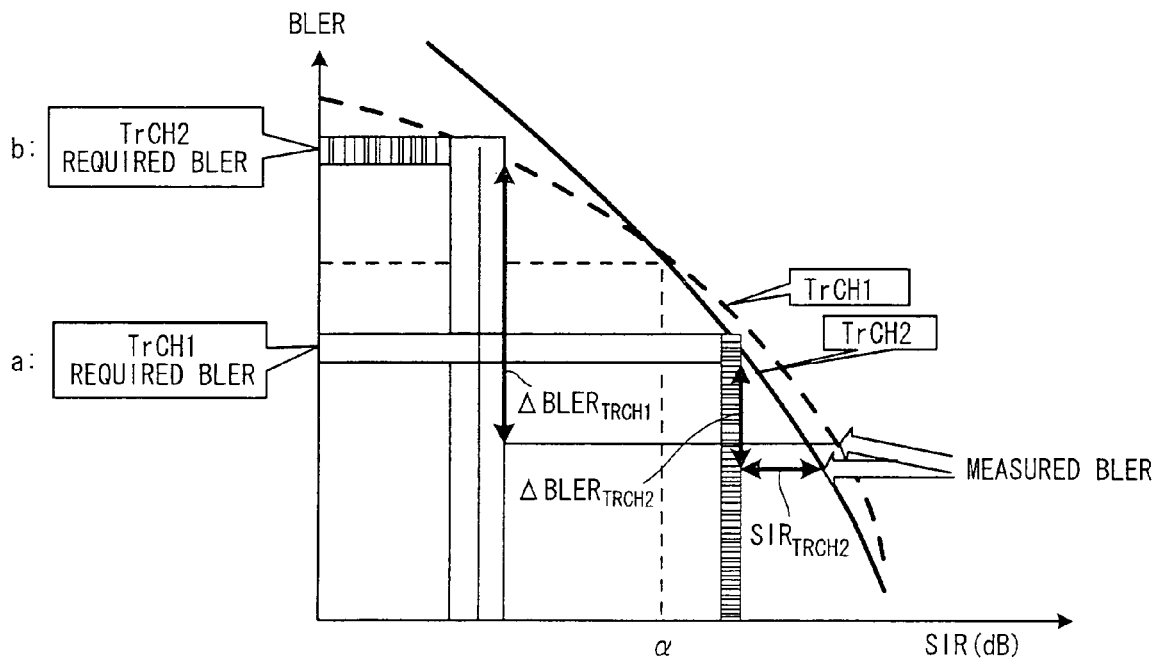
FIG. 13 is a third explanatory view of the third embodiment in a case where two TrCHs are multiplexed and transmitted.

In a case where required-BLER ranges a and b of a TrCH1 of a certain service and of a TrCH2 of another service do not overlap, as shown in FIGS. 12 and 13, the required BLER of the smaller (superior) of the required BLERs of TrCH1, TrCH2 is adopted as the required BLER in multiplexed communication.

① When Measured BLERs of TrCH1, TrCH2 are Both Inferior to the Required-BLER Standard (FIG. 12)

Let the difference between the measured BLER of TrCH1 and the required BLER be $\Delta BLER_{TrCH1}$, and let the difference between the measured BLER of TrCH2 and the required BLER be $\Delta BLER_{TrCH2}$.

Since $\Delta BLER_{TrCH2} > \Delta BLER_{TrCH1}$ in FIG. 12, TrCH2 is selected, the BLER vs. SIR characteristic data of TrCH2 in case of multiplexed TrCHs is read out of the ROM 25, and the value of $\Delta SIR_{TrCH2}$, which is the difference between the SIR value at the time of the required BLER and the SIR value at the time of the measured BLER, is adopted as the SIR updating value on the + side.

② When Measured BLERs of TrCH1, TrCH2 are Both Superior to the Required-BLER Standard (FIG. 13)

Let the difference between the measured BLER of TrCH1 and the required BLER be $\Delta BLER_{TrCH1}$, and let the difference between the measured BLER of TrCH2 and the required BLER be $\Delta BLER_{TrCH2}$.

Since $\Delta BLER_{TrCH1} > \Delta BLER_{TrCH2}$ holds in FIG. 13, TrCH2 is selected, the BLER vs. SIR characteristic data of TrCH2 in case of multiplexed TrCHs is read out of the ROM 25, and the value of $\Delta SIR_{TrCH2}$, which is the difference between the SIR value at the time of the required BLER and the SIR value at the time of the measured BLER, is adopted as the SIR updating value on the − side.

Second Control when Required-BLER Ranges of Multiplexed TrCHs do not Overlap

Figure 14:
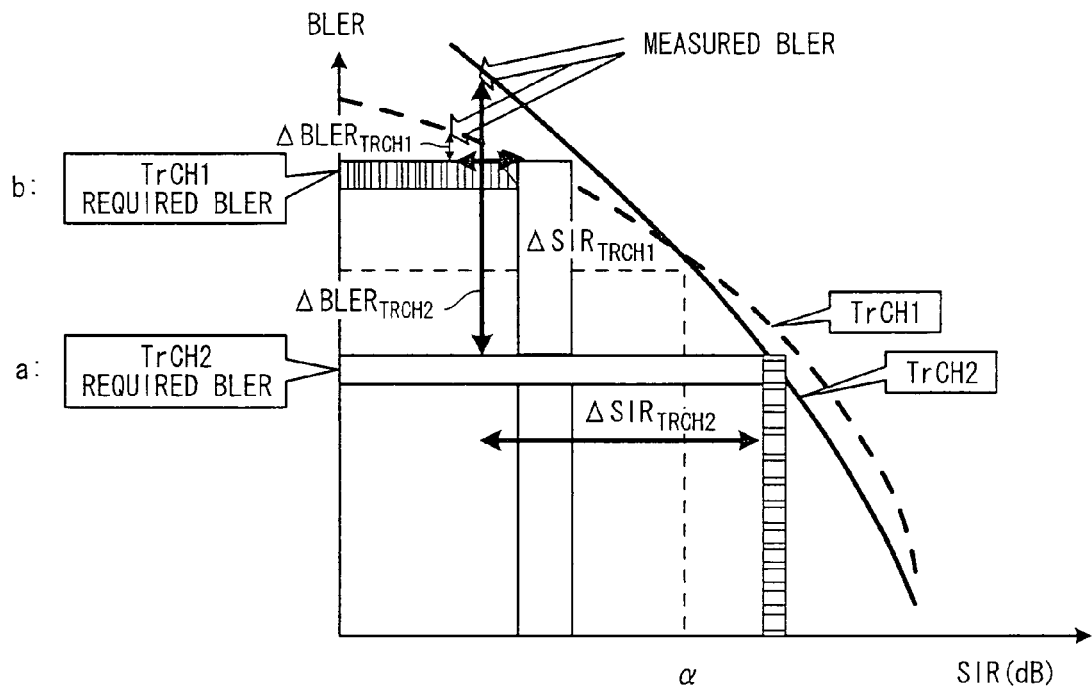
FIG. 14 is a fourth explanatory view of the third embodiment in a case where two TrCHs are multiplexed and transmitted.
Figure 15:
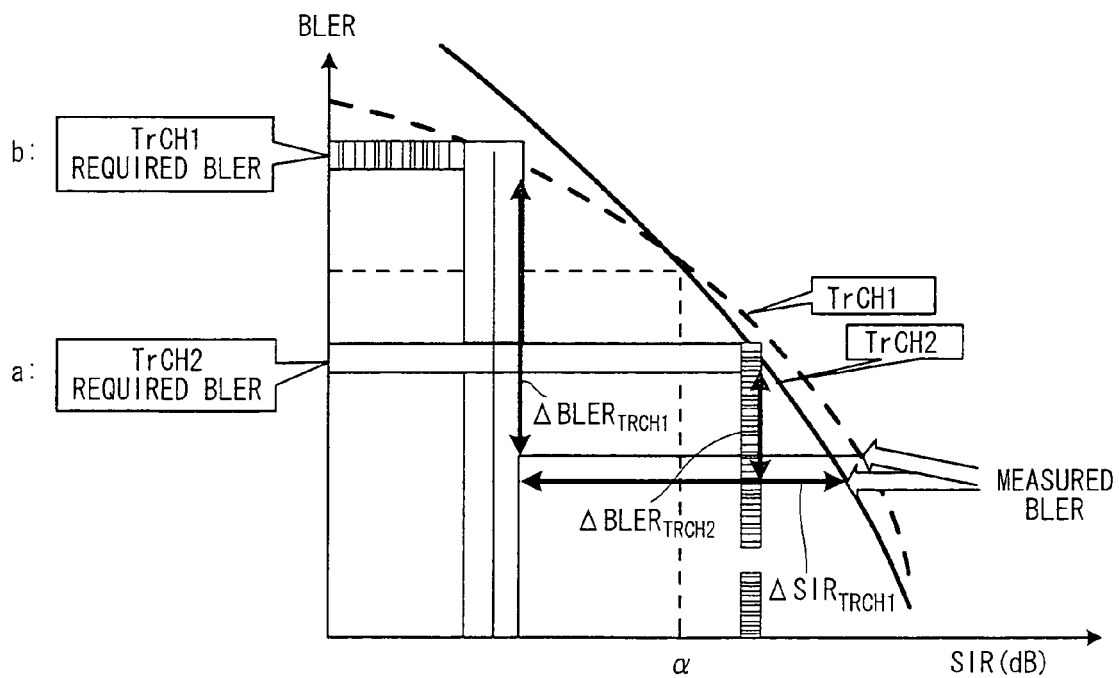
FIG. 15 is a fifth explanatory view of the third embodiment in a case where two TrCHs are multiplexed and transmitted.

In a case where required-BLER ranges a and b of a TrCH1 of a certain service and of a TrCH2 of another service do not overlap, as shown in FIGS. 14 and 15, the required BLER of the larger (inferior) of the required BLERs of TrCH1, TrCH2 is adopted as the required BLER in multiplexed communication. If this arrangement is adopted, the measured BLER of one TrCH will satisfy the required-BLER quality standard, the measured BLER will become the required-BLER standard only for this TrCH, and the other TrCH will fall outside the standard. However, it is possible to make the target SIR the lowest level, and the downlink power from the mobile station can be made the lowest while Standard 4 is satisfied.

① When Measured BLERs of TrCH1, TrCH2 are Both Inferior to the Required-BLER Standard (FIG. 14)

Let the difference between the measured BLER of TrCH1 and the required BLER be $\Delta BLER_{TrCH1}$, and let the difference between the measured BLER of TrCH2 and the required BLER be $\Delta BLER_{TrCH2}'$.

Since $\Delta BLER_{TrCH2} > \Delta BLER_{TrCH1}$ holds in FIG. 14, TrCH1 is selected, the BLER vs. SIR characteristic data of TrCH1 in case of multiplexed TrCHs is read out of the ROM 25, and the value of $\Delta SIR_{TrCH1}$, which is the difference between the SIR value at the time of the required BLER and the SIR value at the time of the measured BLER, is adopted as the SIR updating value on the + side.

② When Measured BLERs of TrCH1, TrCH2 are Both Superior to the Required-BLER Standard (FIG. 15)

Let the difference between the measured BLER of TrCH1 and the required BLER be $\Delta BLER_{TrCH1}$, and let the difference between the measured BLER of TrCH2 and the required BLER be $\Delta BLER_{TrCH2}'$.

Since $\Delta BLER_{TrCH1} > \Delta BLER_{TrCH2}$ holds in FIG. 15, TrCH1 is selected, the BLER vs. SIR characteristic data of TrCH1 in case of multiplexed TrCHs is read out of the ROM 25, and the value of $\Delta SIR_{TrCH1}$, which is the difference between the SIR value at the time of the required BLER and the SIR value at the time of the measured BLER, is adopted as the SIR updating value on the − side.

(D) Fourth Embodiment

In a fourth embodiment, control for updating target SIR in the first to third embodiments is supplemented by providing a timer the time of which is longer than the target-SIR updating period t1, measuring BLER during this time and, if the value departs from standard range, performing target-SIR updating control and performing control in such a manner that the target SIR will follow up a change in the propagation environment at the time of high-speed travel of a mobile station, as when the mobile station is cruising.

By way of example, BLER measurement is performed during a certain fixed period (Tconst) longer than the target-SIR updating period t2, the target SIR is updated in a direction that will raise it by a fixed amount (Sinc_const) in a case where the measured BLER is higher than the standard value by one order of magnitude, and the target SIR is updated in a direction that will lower it by a fixed amount (Sdec_const) in a case where the measured BLER is lower than the standard value by one order of magnitude. Alternatively, BLER measurement is performed during a certain fixed period (Tconst) longer than the target-SIR updating period t2, the target SIR is updated in a direction that will raise it by a fixed amount (Sinc_const) in a case where the measured BLER is inferior to the standard range, and the target SIR is updated in a direction that will lower it by a fixed amount (Sdec_const) in a case where the measured BLER is superior to the standard range. It is arranged so that the parameters Tconst, Sinc_const, Sdec_const can be readily changed externally.

If we let the number of TrBks per TTI of a certain service be TrBk_n, then the total number (=Total_blk) of TrBks per fixed time Tconst will be as follows:

$$Total\_blk = (Tconst/TTI) \times TrBk\_n$$

If the number CRC error blocks during this period of time is crc_ng, then BLER after Tconst(ms) is calculated in accordance with the following equation:

$$BLER = crc\_ng/Total\_blk$$

It is determined whether this BLER value has departed from the standard value by the order level or whether it has departed from the standard range, and the target SIR is controlled based upon the result of the determination.

By way of example, consider a case where the standard for unlimited digital data is as shown in FIG. 16.

In this case, if the measured BLER during the constant time period Tconst(ms) is equal to or greater than $1.0E-04$ ($=1.0 \times 10^{-4}$), a difference will occur on the order level with respect to the standard range. In such case, therefore, updating of the target SIR is performed by Sinc_const(dB). Further, if the measured BLER has fallen below $1.0E-05$ ($=1.0 \times 10^{-5}$), then an error has occurred at the order level and therefore updating of target SIR is performed by Sdec_const(dB).

This correction processing makes it possible to cause the target SIR to follow up a fluctuation in downlink propagation environment with good precision, as by using this processing is combination with the first to third embodiments when the range of fluctuation in target SIR per unit time is very large, as when the mobile station is cruising at high speed.

Figure 17:
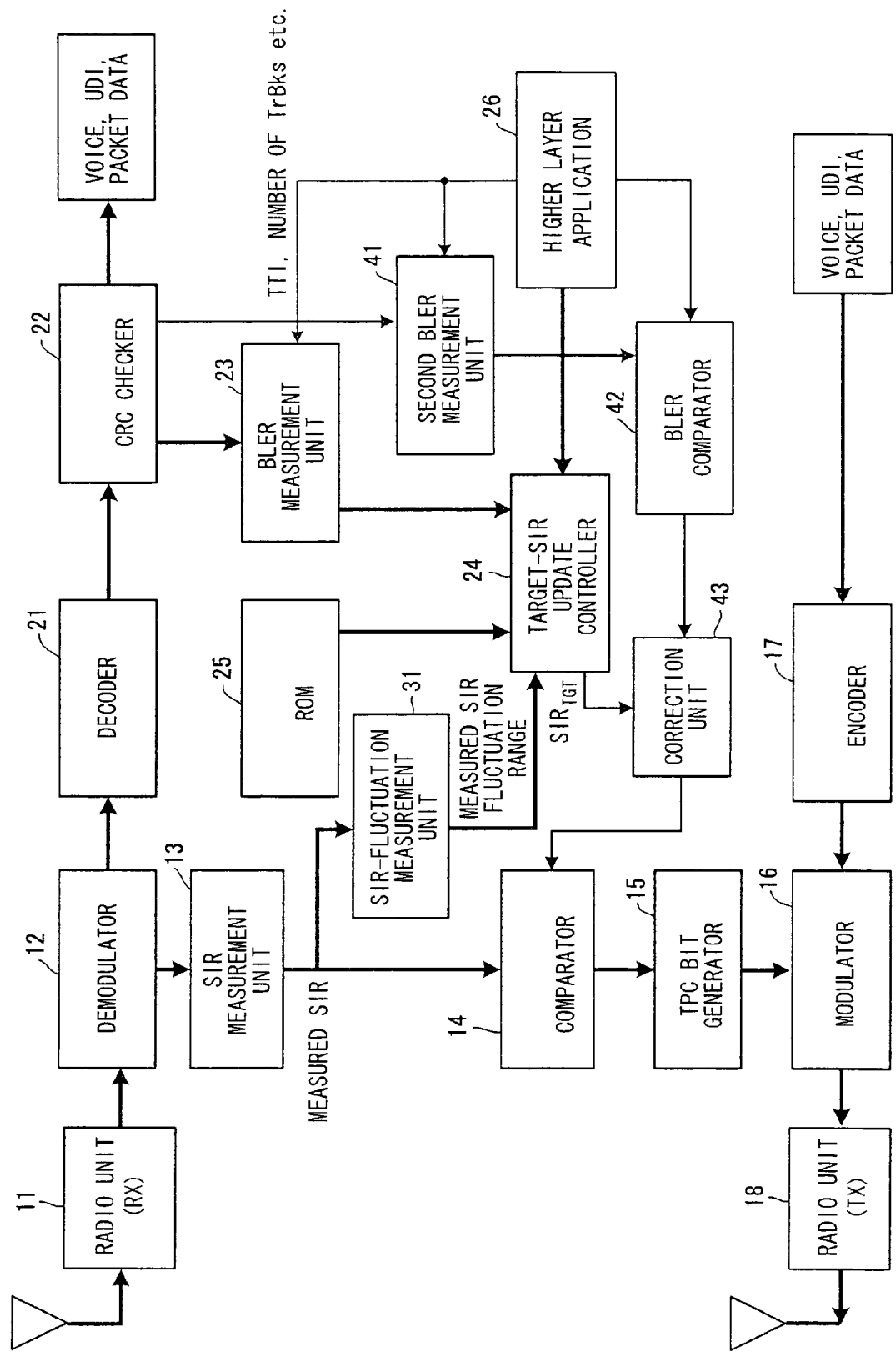
FIG. 17 is a diagram illustrating the structure of a transmission power control apparatus in a mobile station according to a fourth embodiment.

FIG. 17 is a diagram illustrating the structure of a transmission power control apparatus according to the fourth embodiment, in which components identical with those of the first embodiment in FIG. 1 are designated by like reference characters. This embodiment differs from the first embodiment in that it is provided with a second BLER measurement unit 41, a BLER comparator 42 and a correction unit 43. The second BLER measurement unit 41 performs BLER measurement over a span Tconst longer than the target-SIR updating period t2 of the first embodiment, the BLER comparator 42 compares the measured BLER measured by the second BLER measurement unit 41 and the standard value and determines whether the difference between them is greater than a set value, and the correction unit 43 increases or decreases the target SIR ($=SIR_{TGT}$) based upon the result of comparison by the BLER comparator 42.

Figure 18:
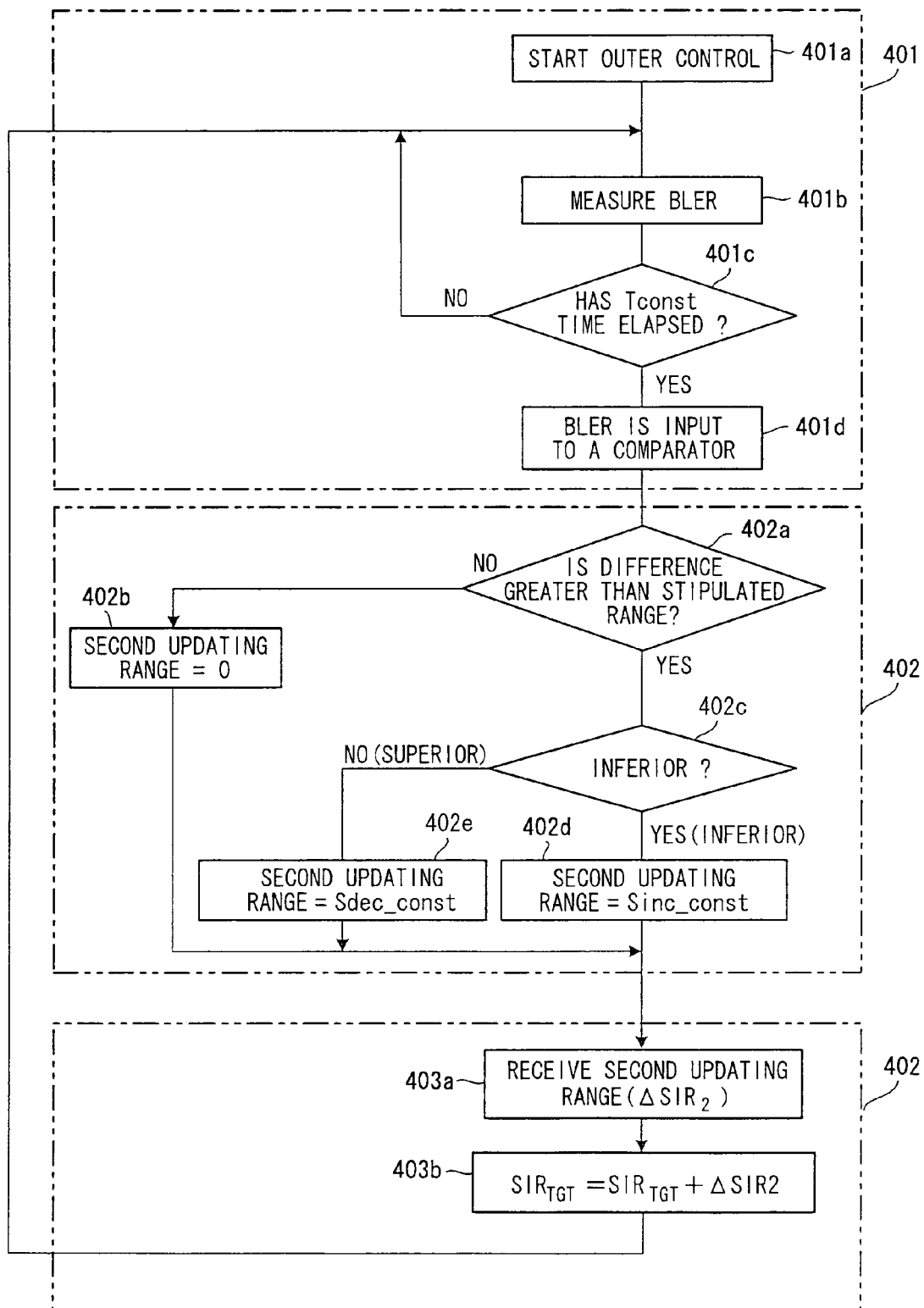
FIG. 18 is a flowchart of processing according to the fourth embodiment.
Figure 19:
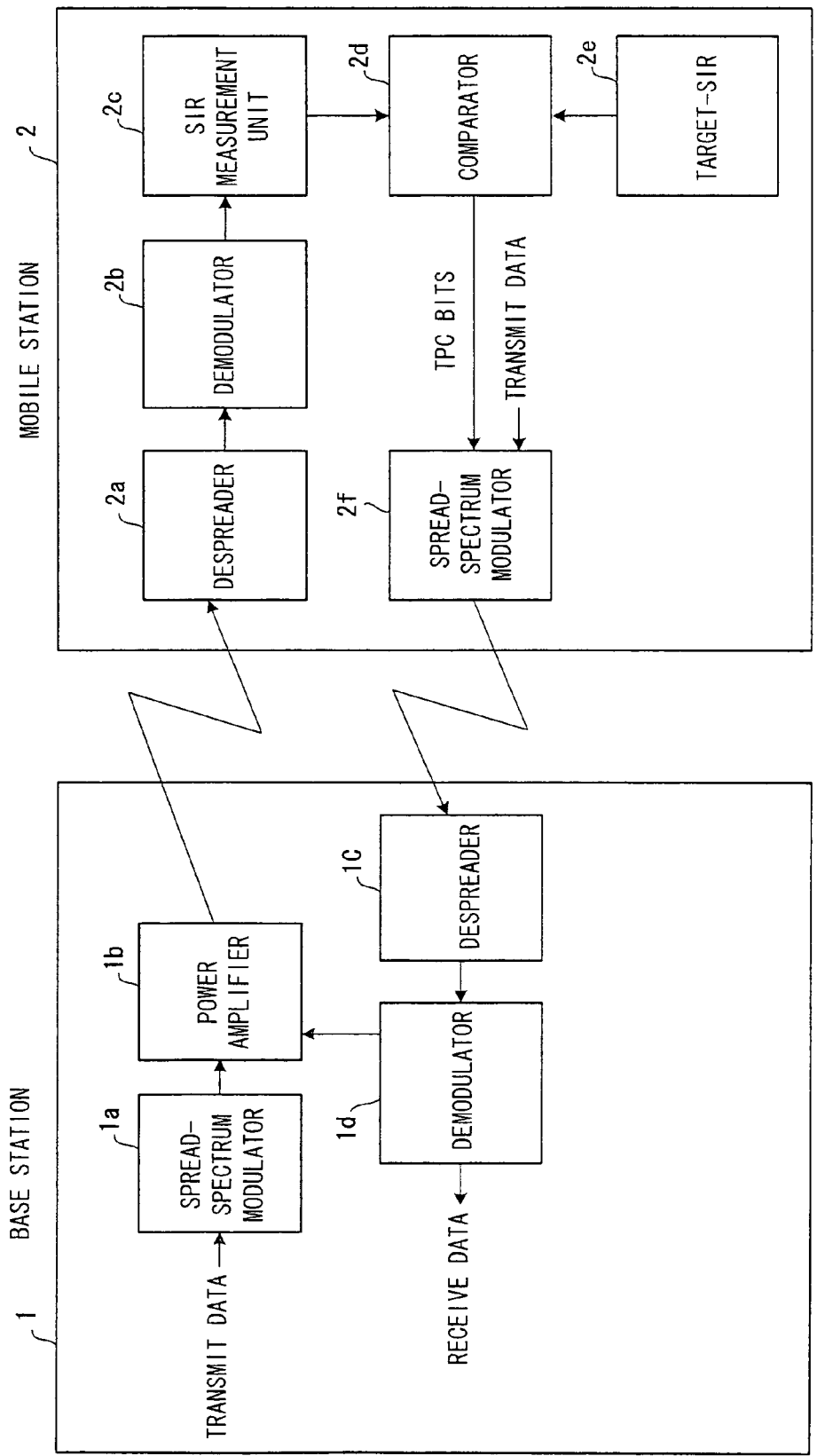
FIG. 19 is a diagram useful in describing inner-loop transmission power control according to the prior art.
Figure 20:
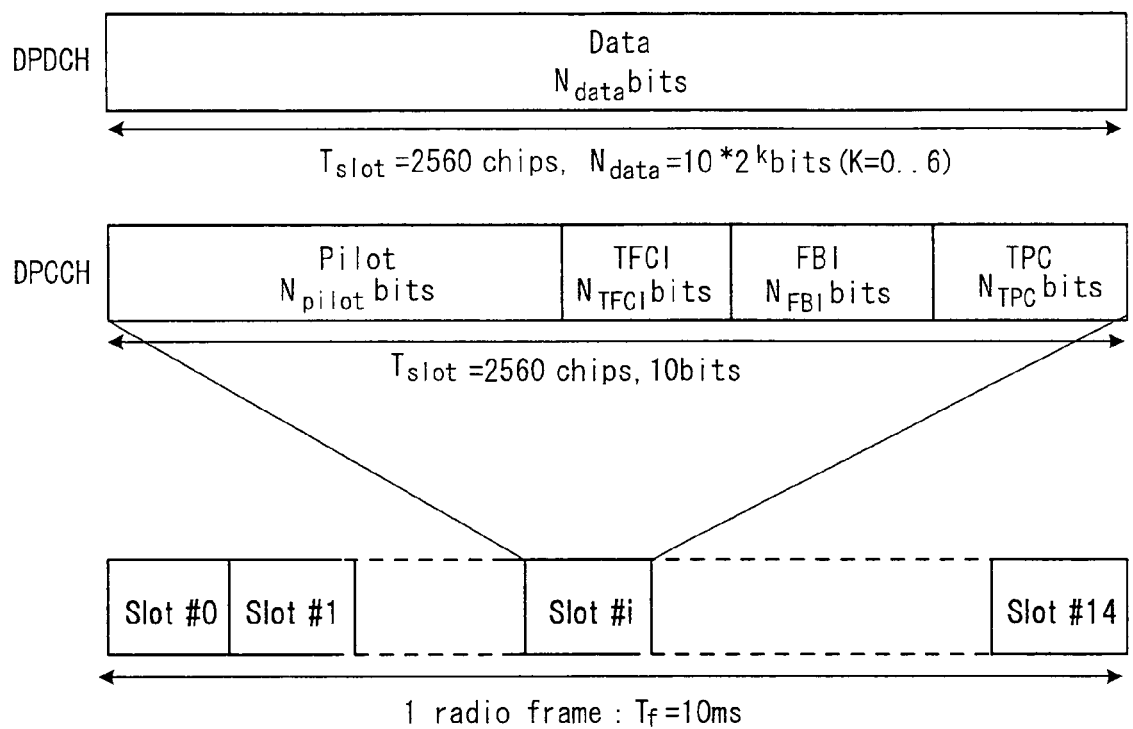
FIG. 20 is a diagram showing the structure of a dedicated physical channel DPCH frame of an uplink.
Figure 21:
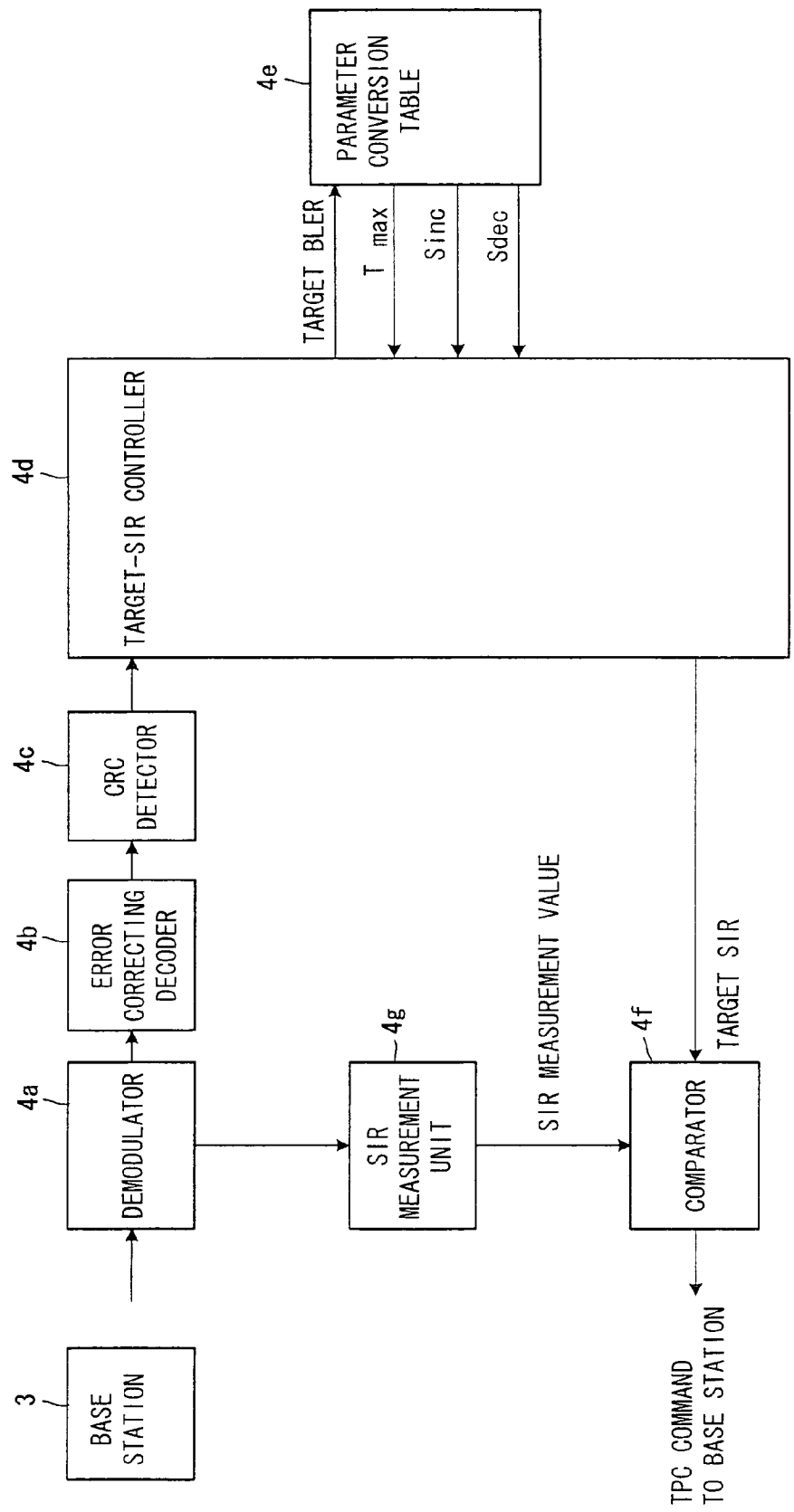
FIG. 21 is a block diagram of well-known outer-loop control.
Figure 22:
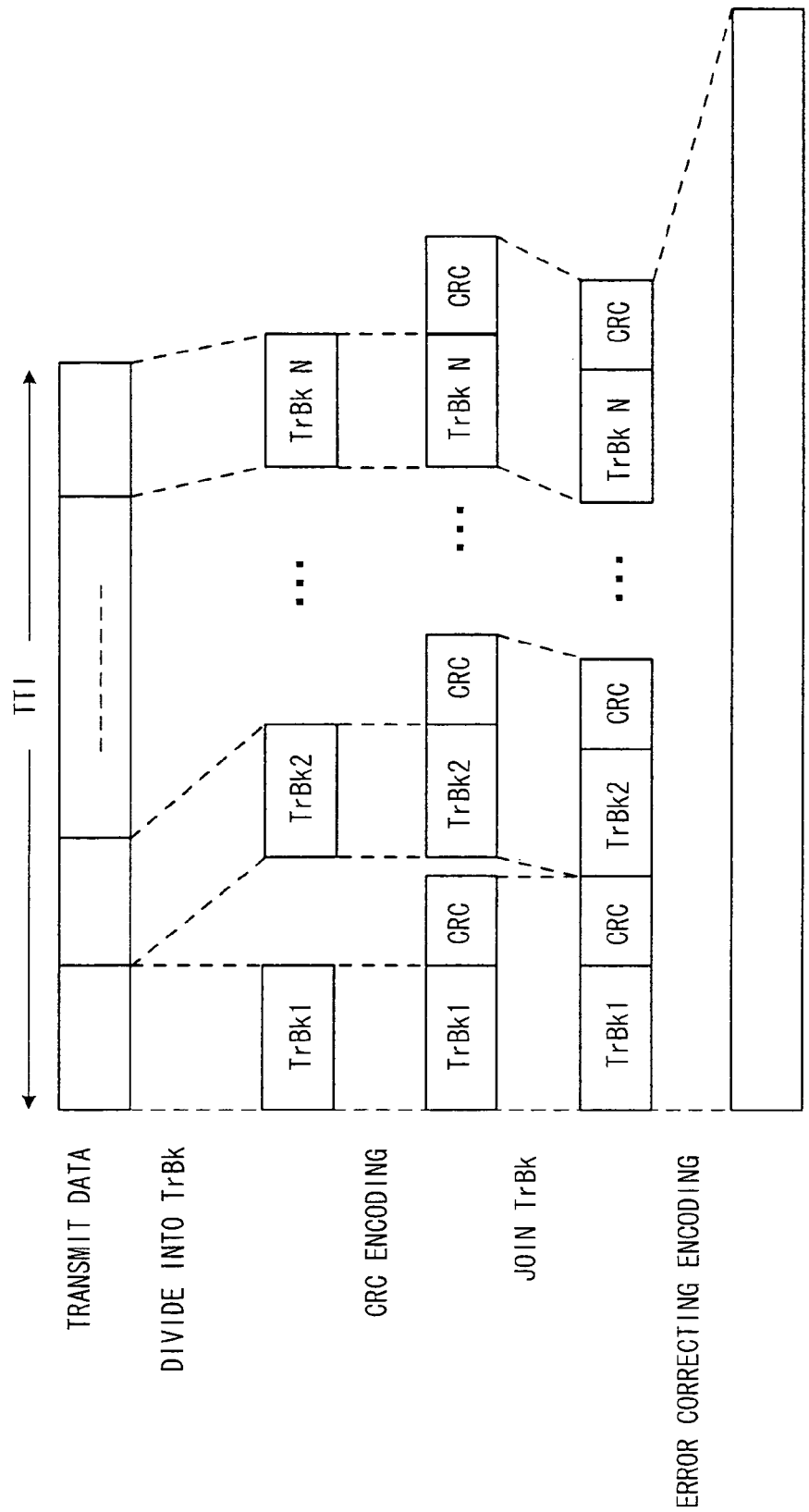
FIG. 22 is a diagram for describing encoding.

FIG. 18 is a flowchart of processing according to the second embodiment. Processing 401 is the processing of the second BLER measurement unit 41, processing 402 is the processing of the BLER comparator 42, and processing 403 is the processing of the correction unit 43.

After outer-loop control starts (step 401a), the second BLER measurement unit 41 starts BLER measurement and continues measuring BLER until the fixed time period Tconst elapses (steps 401b, 401c). If the fixed time period Tconst elapses, the result of BLER measurement is input to the BLER comparator 42 (step 401d).

If the result of BLER measurement is received, the BLER comparator 42 compares this BLER measurement value with the stipulated BLER set by the higher layer application 26 and determines whether the difference between the value of measured BLER and the stipulated BLER is greater than the standard range (step 402a). If the difference is within the standard range, then the BLER comparator 42 performs the following operation: second updating range $\Delta SIR2=0$ (step 402b). However, if the difference is greater than the stipulated range, then the BLER comparator 42 determines whether BLER is inferior or superior (step 402c). The BLER comparator 42 performs the following operation: second updating range $\Delta SIR2$=Sinc_const (step 402d) if BLER is inferior, and performs the following operation: second updating range $\Delta SIR2$=Sdec_const (step 402e) if BLER is superior.

If the second updating range $\Delta SIR2$ is received from the BLER comparator 42 (step 403a), the correction unit 43 corrects the target SIR (=$SIR_{TGT}$) according to the following equation:

$$SIR_{TGT} = SIR_{TGT} + \Delta SIR2$$

and inputs the new target SIR to the comparator 14 (step 403b). If outer-loop control ends owing to call disconnect, etc., then the processing of each section of FIG. 18 ends immediately.

(E) Effects of the Present Invention

According to the present invention, it is possible to satisfy the standard of initial pull-in time as well as the standard regarding time to follow up a target SIR finalized at subsequent initial pull-in.

Further, in accordance with the present invention, it is possible to perform downlink power control accurately at the time of individual TrCH communication and at the time of multiplexed TrCH communication.

Further, in accordance with the present invention, if required-BLER ranges of respective TrCHs do not overlap when a plurality of TrCHs have been multiplexed, the BLER measurement value with regard to one TrCH is made to fall within the BLER range, and BLER measurement can be placed in an excellent state above the standard with regard to other TrCHs. As a result, it is possible to exercise control such that the qualities of all TrCHs meet or exceed the standard.

Further, in accordance with the present invention, if required-BLER ranges of respective TrCHs do not overlap when a plurality of TrCHs have been multiplexed, the BLER measurement value with regard to one TrCH is made to fall within the BLER range and the quality obtained is below the standard with regard to other TrCHs. However, since updating of the target SIR is maintained at the lowest level, downlink power from the base station can be held to the minimum.

Further, in accordance with the present invention, fluctuation of the propagation environment is monitored. When fluctuation is large, control for updating target SIR is performed individually and concurrently. In an environment in which the receive propagation environment fluctuates, therefore, it is possible to control the updating of target SIR more accurately.

What is claimed is:

1. A transmission power control method for controlling a target SIR which is a target ratio of signal to interference upon comparing a measured error rate and a target error rate of receive data on a receiving side, and causing transmission power control to be performed on a transmitting side so that measured SIR will agree with said target SIR, comprising:
    previously measuring and storing a correspondence characteristic between error rate and SIR;
    finding a first SIR corresponding to the target error rate and a second SIR corresponding to the measured error rate from the correspondence characteristic; and
    updating the target SIR by increasing or decreasing the target SIR by an amount equal to a difference in values of the first SIR and the second SIR.

2. A transmission power control method according to claim 1, wherein:
    in a first step, previously measuring and storing the correspondence characteristic between error rate and SIR, for each service in every combination of services multiplexed, in a case where a plurality of services are multiplexed and transmitted;
    in a case where a plurality of services of a prescribed combination are multiplexed and transmitted, finding, from said characteristic, the first SIR with respect to said target error rate and the second SIR with respect to said measured error rate of each service in said combination; and
    in the updating step, updating said target SIR by increasing or decreasing said target SIR based upon the difference between said first SIR and second SIR of every service.

3. A transmission power control method according to claim 2, wherein in the updating step, updating the target SIR so as to satisfy a required error rate of a service for which a higher quality is required if, in a case where a plurality of services of a prescribed combination are multiplexed and transmitted, required error-rate ranges of respective ones of the services in said combination do not overlap.

4. A transmission power control method according to claim 2, wherein in the updating step, updating the target SIR so as to satisfy a required error rate of a service for which a lower quality is required if, in a case where a plurality of services of a prescribed combination are multiplexed and transmitted, required error-rate ranges of respective ones of the services in said combination do not overlap.

5. A transmission power control method according to claim 1, wherein the updating step includes:
    updating said target SIR at a first period in order to pull error rate into a stipulated range of required error rates within a first stipulated time, and
    updating said target SIR at a second period, which is longer than the first period, after pull-in in order to make the error rate converge to within said stipulated range within a second stipulated time.

6. A transmission power control method according to claim 5, the updating step further includes:
    deciding said first period t1 upon comparing a time, which is required to acquire said measured error rate, with said first stipulated time, and
    updating the target SIR when pull-in is performed at the first period t1.

7. A transmission power control method according to claim 6, wherein previously storing said second time t2 ($>$t1), or a ($>$1) that prevails when t2=$\alpha \cdot$t1 holds, and updating the target SIR at this second period t2 after pull-in.

8. A transmission power control method according to claim 5, the updating step further includes:
- setting target SIR of an initial setting sufficiently higher than a SIR that satisfies the required error rate in a case where the time required to acquire said measured error rate is greater than said first stipulated time;
- adopting said first period as a decision period for deciding whether or not an error is present;
- investigating occurrence of error at said period;
- reducing the target SIR a prescribed amount if an error does not occur; and
- deciding that pull-in has been completed when an error occurs.

9. A transmission power control method according to claim 5, wherein the updating step further includes: previously storing range of fluctuation of SIR of said second period in a static environment; and
- shortening said second period if the actual range of fluctuation of SIR is greater than said stored range of fluctuation by more than a set value.

10. A transmission power control method according to claim 5, wherein the updating step further includes:
- providing an error-rate measurement interval that is longer than said second period;
- increasing the target SIR a prescribed amount if the error rate in this interval is inferior to the required error rate by more than a set value; and
- decreasing the target SIR a prescribed amount if the error rate in this interval is superior to the required error rate by more than a set value.

11. A transmission power control method according to claim 1, wherein in a first step, storing said correspondence characteristic in accordance with service quality and in the updating step, updating said target SIR using a characteristic that conforms to a service of a transport channel.

12. A transmission power control method according to claim 1, further comprising linearly approximating and storing said correspondence characteristic.

13. A transmission power control apparatus configured to update a target SIR which is a target ratio of signal to interference upon comparing error rate and target error rate of receive data on a receiving side, and causing transmission power control to be performed on a transmitting side in such a manner that measured SIR will agree with the target SIR, the transmission power control apparatus comprising:
- a storage configured to store a correspondence characteristic between error rate and SIR; and
- a controller configured to find a first SIR corresponding to a target error rate and a second SIR corresponding to a measured error rate from the correspondence characteristic, and to update the target SIR by increasing or decreasing the target SIR by an amount equal to a difference in values of the first SIR and the second SIR.

14. A transmission power control apparatus according to claim 13, further comprising a storage configured to store either t2 or $\alpha$ (>1) that prevails when $t2 = \alpha \cdot t1$ holds, where t1 represents a first updating period of said target SIR for pulling error rate into a stipulated range of required error rates within a first stipulated time, and t2 represents a second updating period, which is longer than said first updating period, for making the error rate converge to within said stipulated range within a second stipulated time after pull-in;
- wherein when pull-in is performed, said controller updates the target SIR at said first updating period t1 and updates the target SIR at said second updating period t2 after pull-in.

15. A transmission power control apparatus according to claim 14, further comprising a storage, as an initial target SIR, a SIR that is sufficiently higher than a SIR that satisfies the required error rate in a case where the time required to acquire said measured error rate is greater than said first stipulated time;
- wherein when pull-in is performed, said controller adopts the target SIR as said initial target SIR, adopts said first updating period t1 as a period for investigating whether there is an error, investigates occurrence of error at said period, reduces the target SIR a prescribed amount if an error does not occur, and decides that pull-in has been completed when an error occurs.

16. A transmission power control apparatus according to claim 14, further comprising:
- a storage configured to store previously storing range of fluctuation of SIR in said second period in a static environment; and
- a period changing portion configured to compare actual range of fluctuation of SIR and said stored range of fluctuation and to shorten said second updating period if the difference is greater than a set value.

17. A transmission power control apparatus according to claim 14, further comprising a second target SIR updating portion configured to provide an error-rate measurement interval that is longer than said second updating period, to increase the target SIR a prescribed amount if the error rate in this interval is inferior to the required error rate by more than a set value, and to decrease the target SIR a prescribed amount if the error rate in this interval is superior to the required error rate by more than a set value.

18. A transmission power control apparatus according to claim 14, wherein if, in a case where a plurality of services of a prescribed combination are multiplexed and transmitted, required error-rate ranges of respective ones of the services in said combination do not overlap, then said controller uses a required error rate of a service for which a higher quality is required as said required error rate.

19. A transmission power control apparatus configured to update a target SIR which is a target ratio of signal to interference upon comparing error rate and target error rate of receive data on a receiving side, and causing transmission power control to be performed on a transmitting side in such a manner that measured SIR will agree with said target SIR, the transmission power control apparatus comprising:
- a storage configured to store a correspondence characteristic between error rate and SIR, for each service in every combination of services multiplexed, in a case where a plurality of services are multiplexed and transmitted; and
- a controller configured to acquire, from the characteristic, a first SIR corresponding to a target error rate and a second SIR corresponding to a measured error rate of each service in the combination in a case where a plurality of services of a prescribed combination are multiplexed and transmitted, and to update the target SIR by increasing or decreasing the target SIR by an amount equal to a difference in values of said first SIR and second SIR of every service.

20. A transmission power control apparatus according to claim 19, wherein if, in a case where a plurality of services of a prescribed combination are multiplexed and transmitted, required error-rate ranges of respective ones of the services in said combination do not overlap, then said controller uses a required error rate of a service for which a lower quality is required as said required error rate.

* * * * *